United States Patent
Cochran et al.

(10) Patent No.: US 11,702,544 B2
(45) Date of Patent: *Jul. 18, 2023

(54) GROUND TIRE RUBBER DENSITY MODIFICATION USING ELASTOMERIC POLYMERS

(71) Applicant: Iowa State University Research Foundation, Inc., Ames, IA (US)

(72) Inventors: Eric W. Cochran, Ames, IA (US); Nacu Hernandez, Ames, IA (US); Ronald Christopher Williams, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,548

(22) Filed: Dec. 27, 2021

(65) Prior Publication Data

US 2022/0186032 A1 Jun. 16, 2022

Related U.S. Application Data

(63) Continuation of application No. 16/445,866, filed on Jun. 19, 2019, now Pat. No. 11,242,459.

(60) Provisional application No. 62/688,604, filed on Jun. 22, 2018.

(51) Int. Cl.
| | |
|---|---|
| C08L 95/00 | (2006.01) |
| C08L 9/06 | (2006.01) |
| C08L 23/22 | (2006.01) |
| C08L 91/00 | (2006.01) |

(52) U.S. Cl.
CPC .............. *C08L 95/00* (2013.01); *C08L 9/06* (2013.01); *C08L 23/22* (2013.01); *C08L 91/00* (2013.01); *C08L 2555/34* (2013.01); *C08L 2555/72* (2013.01); *C08L 2555/84* (2013.01)

(58) Field of Classification Search
None
See application file for complete search history.

(56) References Cited

U.S. PATENT DOCUMENTS

| 4,992,492 A | 2/1991 | Sainton | |
|---|---|---|---|
| 11,242,459 B2 | 2/2022 | Cochran et al. | |
| 2010/0056669 A1* | 3/2010 | Bailey | B29B 9/16 |
| | | | 523/201 |

FOREIGN PATENT DOCUMENTS

EP 2628772 A1 8/2013

OTHER PUBLICATIONS

Dahim, M. "Enhancement the Performance of Asphalt Pavement Using Fly Ash Wastes in Saudi Arabia", International Journal of Engineering and Technology, 7 (3.32), pp. 50-53, 2018. (Year: 2018).*
Parchem Fine & Specialty Chemicals Tall Oil Pitch Safety Data Sheet, Sep. 13, 2016. (Year: 2016).*
Way, G., "Asphalt-Rubber Standard Practice Guide", Rubber Pavements Association, Oct. 17, 2011 (Year: 2011).*
SBS material data sheet BassTech International, Sep. 13, 2012. (Year: 2012).*
Flosenzier, "The Effects of Blending Small Amounts of Homopolystyrene on the Mechanical Properties of a Low Styrene Content Styrene-Butadiene-Styrene Block copolymer", Polymer Engineering and Science, 30 (1), 49-58, Jan. 1990. (Year: 1990).*
Kamiya, "Compatibilizer Role of Styrene-Butadiene-Styrene Triblock Copolymer in Asphalt", Polymer Journal, 33(3), pp. 209-213, 2001. (Year: 2001).*
Hallmark-Haack et al., "Ground Tire Rubber Modification for Improved Asphalt Storage Stability," Energy Fuels 33 (4):2659-2664 (2019).
Dahim M., "Enhancement the Performance of Asphalt Pavement Using Fly Ash Wastes in Saudi Arabia," International Journal of Engineering & Technology 7(3.32):50-53 (2018).
Safety Data Sheet for Tall Oil Pitch, Parchem Fine & Specialty Chemicals, Sep. 13, 2016.
Way et al., "Asphalt-Rubber Standard Practice Guide," Rubber Pavements Association, Oct. 17, 2011.
Material Safety Data Sheet for Styrene-Butadiene-Styrene (SBS), BassTech International, Sep. 13, 2012.
Flosenzier et al., "The Effects of Blending Small Amounts of Homopolystyrene on the Mechanical Properties of a Low Styrene Content Styrene-Butadiene-Styrene Block Copolymer, " Polymer Engineering and Science 30(1):49-58 (1990).
Kamiya et al., "Compatibilizer Role of Styrene-Butadiene-Styrene Triblock Copolymer in Asphalt, " Polymer Journal 33 (3):209-213 (2001).

* cited by examiner

*Primary Examiner* — Christopher M Rodd
(74) *Attorney, Agent, or Firm* — Troutman Pepper Hamilton Sanders LLP (Rochester)

(57) ABSTRACT

The present invention relates to an asphalt product that comprises an asphalt component and a plurality of pellets comprising a mixture of a ground tire rubber and an elastomeric polymer, where the density difference between the asphalt component and the plurality of pellets is less than 10%. The present invention further relates to a pellet comprising a ground tire rubber ("GTR") and an elastomeric polymer mixed with the GTR, where the GTR has a density of less than 1.12 g/cm³. Also disclosed are methods of producing improved asphalt and paving a surface.

23 Claims, 4 Drawing Sheets

GROUND TIRE RUBBER DENSITY MODIFICATION USING ELASTOMERIC POLYMERS

This application is a continuation of U.S. patent application Ser. No. 16/445,866, filed Jun. 19, 2019, which claims the benefit of U.S. Provisional Patent Application Ser. No. 62/688,604, filed Jun. 22, 2018, which are hereby incorporated by reference in their entirety.

FIELD OF THE INVENTION

The present invention relates to ground tire rubber density modification using elastomeric polymers.

BACKGROUND OF THE INVENTION

Asphalt covers 94% of paved roads in the United States. Many improvements have been made to improve the durability and viscoelastic performance of asphalt, for example, the addition of styrene-butadiene based polymers and addition of ground tire rubber ("GTR"), among others.

Asphalt blended with GTR (also known as crumb rubber, or recycled tire rubber) has been used extensively and has been previously described. The addition of the rubber to asphalt allows for improved performance of roads or other paved surfaces due to resistance to rutting, cracking and deformation. Furthermore, the addition of GTR can reduce road noise. Not only does the rubber improve the performance of the asphalt, it allows old tires to be recycled into a useful substance instead of piling up in tire dumps. The addition of GTR has proven to be a cost-effective way to improve the resilience of the road as well as its viscoelastic properties.

However, asphalt blended with GTR has not been widely adopted as it has a higher density when compared to asphalt (1.1 gm/cm$^3$ versus 1.03 gm/cm$^3$), causing it to settle to the bottom of the asphalt mix if not continuously stirred. As a result, the GTR was not sufficiently distributed within the asphalt composition, thus requiring continuous agitation. Even in instances where settling of GTR is mitigated, that reduction was time sensitive and not a permanent or long lasting solution to improving road resilience or viscolelastic properties of asphalt.

Moreover, previously known processes for incorporating GTR into bituminous material to make asphalt cement systems suitable for paving and other uses have hitherto been unduly complex and thus costly in use. Known processes use additional constituents of the composition and additional process steps in an attempt to provide a homogenous system. Such attempts have not been successful.

The re-use and recycling of GTR is not a new idea. In the early 1900s, many tire manufacturers recycled scrap tires. However, as production costs declined, tire recycling almost disappeared, particularly upon the introduction of steel belted radial tires because of the difficulties involved in dealing with the steel belts. In the United States alone, there are hundreds of millions of scrap tires accumulating annually, in addition to an existing supply of over 500 million that are stockpiled, privately stored or illegally dumped. Waste scrap tires present landfill problems because they do not disintegrate, and, therefore, occupy a continuously increasing volume. Waste scrap tires also form fertile breeding grounds for mosquitoes, rats, and other pests.

Disposing of huge stockpiles of used and waste tires has long been a problem for governmental entities and environmental organizations. In getting a solution for disposing of waste tires, scientists and engineers have been continuously studying recovery of organic wastes such as waste tires. There are many ways to dispose of waste tires. Landfills have been one means of disposal; however, due to the limitation of the resource of land, landfills are not suitable. Other means of tire disposal include incineration, use in road construction, and in making recycled tires.

The present invention is directed to overcoming these and other deficiencies in the art.

SUMMARY OF THE INVENTION

A first aspect of the present invention relates to an asphalt product. The asphalt product comprises an asphalt component and a plurality of pellets comprising a mixture of a ground tire rubber ("GTR") and an elastomeric polymer. The asphalt component and the plurality of pellets have a difference in density of less than 10%.

A second aspect of the present invention relates to a pellet comprising a ground tire rubber ("GTR") and an elastomeric polymer mixed with the GTR. The GTR has a density of less than 1.12 g/cm$^3$.

A third aspect of the present invention relates to a method of producing an improved asphalt. The method includes providing an asphalt component; providing a plurality of pellets each comprising a mixture of a ground tire rubber ("GTR") and an elastomeric polymer mixed with the GTR; and mixing the asphalt component with the plurality of pellets under conditions effective to produce an asphalt product. The asphalt component and the plurality of pellets have a difference in density of less than 10%.

A fourth aspect of the present invention relates to a method of paving a surface. The method includes: (a) providing a ground tire rubber ("GTR"); (b) providing an elastomeric polymer; (c) mixing the GTR and the elastomeric polymer to produce a GTR-elastomeric polymer mixture; (d) forming the GTR-elastomeric polymer mixture into a plurality of pellets; (e) mixing the plurality of pellets with an asphalt component, where the asphalt component and the plurality of pellets have a density difference of less than 10%; and (f) applying the mixture of the plurality of pellets and the asphalt component to a surface to be paved to form an applied paving material.

The present invention introduces the use of elastomeric polymers, such as polyisoprene ("PI") (including, for example, cis-1,4-polyisoprene and trans-1,4-polyisoprene), polybutadiene ("PB"), and polyisobutylene ("PIB"), as a way to modify the density of GTR before it is mixed in asphalt. This will help mitigate and/or suppress as well as invert the settling of the GTR particles in the asphalt mixture that would otherwise occur in the absence of the use of the elastomeric polymers.

The addition of elastomeric polymers as a way to modify the density of GTR before it is mixed with asphalt provides many unexpected advantages over previously existing GTR-asphalt mixtures. For example, the elastomeric polymer-modified GTR-asphalt mixtures of the present invention allow for improved performance of roads and other paved surfaces, such as sport courts, and resistance to rutting, cracking, and deformation. Moreover, the elastomeric polymer modified GTR-asphalt mixtures of the present invention reduce road noise, improve asphalt performance, and recycles old tires which may otherwise be stockpiled for decades. The present invention is a cost-effective way to improve road resilience and control dispersion of GTR particles in asphalt without continuous agitation. The results of the present invention show consistent improvement of the binder high temperature grade for both a 12% and a 15% of the GTR/polymer blends as compared to a 12% and a 15% of only the GTR.

DETAILED DESCRIPTION OF THE INVENTION

Figure 1:
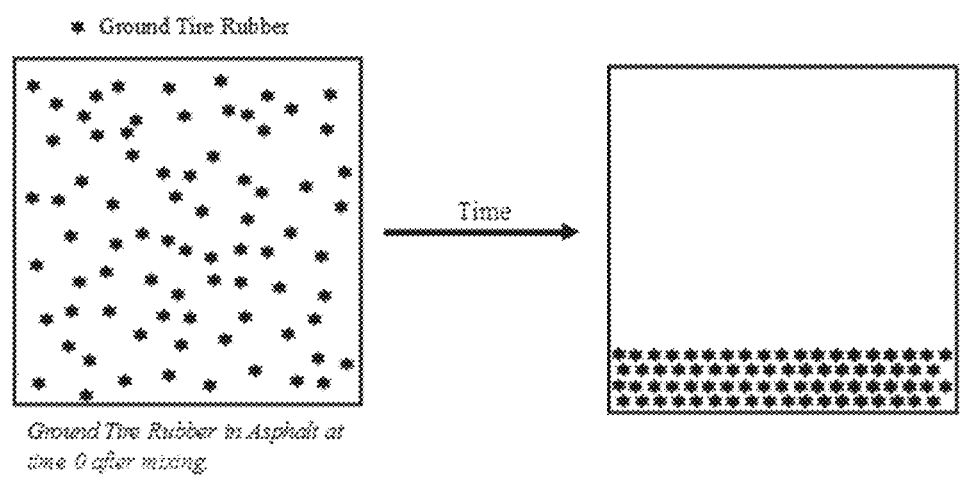
FIG. 1 depicts GTR particles settling after time, illustrating the phenomenon that occurs with GTR modified asphalt in the absence of an elastomeric polymer.

A first aspect of the present invention relates to an asphalt product. The asphalt product comprises an asphalt component and a plurality of pellets comprising a mixture of a ground tire rubber ("GTR") and an elastomeric polymer. The asphalt component and the plurality of pellets have a difference in density of less than 10%.

The asphalt component includes asphalt. Asphalt contains material in which the predominating constituents are bitumens, which occur in nature or are obtained in petroleum processing. Bitumens include solid, semisolid, or viscous substances, natural or manufactured, composed principally of high molecular weight hydrocarbons. The asphalt component used in the present invention is not particularly limited, and various kinds of asphalts may be used. Examples of the asphalt include straight asphalts such as petroleum asphalts for pavements, as well as polymer-modified asphalts produced by modifying asphalt with a polymer material including a thermoplastic elastomer such as styrene/butadiene block copolymers ("SBS"), styrene/isoprene block copolymers ("SIS"), and ethylene/vinyl acetate copolymers ("EVA").

Asphalt is composed of four distinct chemical fractions, namely asphaltenes, resins, aromatics, and saturates. Resins, aromatics, and saturates are collectively referred to as maltenes. The high molecular weight asphaltenes form a colloidal suspension in low molecular weight maltenes. Apart from the asphaltene content, the resins also play an important role, because they act as dispersing agents to the asphaltenes. The ratio of resins to asphaltenes is an important parameter that controls the degree of dispersion of asphaltenes and accordingly the asphalt viscosity (Telford, T., THE SHELL BITUMEN INDUSTRIAL HANDBOOK (1995), which is hereby incorporated by reference in its entirety).

Suitable grades of the asphalt component include the following: PG52-22, PG58-22, PG64-22, PG67-22, PG70-22, PG76-22, PG82-22, PG52-28, PG58-28, PG64-28, PG67-28, PG70-28, PG76-28, PG52-34, PG58-34, PG64-34, PG67-16, PG70-16, PG76-16, PG64-10, PG67-10, PG70-10, PG76-10, pen grade 40-50, pen grade 60-70, pen grade 85-100, pen grade 120-150, AR4000, AR8000, AC10 grade, AC20 grade, and AC30 grade. F. Roberts et al., "Hot Mix Asphalt Materials, Mixture Design, and Construction," NAPA Research and Education Foundation (2nd ed.) (1996), which is hereby incorporated by reference in its entirety.

The ground tire rubber ("GTR") according to the present invention is known, for example, as crumb rubber or recycled tire rubber. GTR according to the present invention may be recycled tire rubber which has been ground into very small particles to use to modify asphalt. GTR can be used to modify asphalt and can improve rutting resistance, skid resistance, ride quality, pavement life, and can reduce pavement noise levels. Adding GTR to the elastomeric polymers to form pellets and ultimately asphalt in accordance with the present invention slows aging and oxidation of the resulting composition, which increases pavement life by lessening brittleness and cracking. Methods for modifying asphalt are described in U.S. Pat. No. 4,992,492 and European Patent No. EP 2 628 722, both of which are hereby incorporated by reference in their entirety, and neither of which achieve the asphalt product of the present invention which has an asphalt component and a plurality of pellets comprising a mixture of a ground tire rubber ("GTR") and an elastomeric polymer, where the asphalt component and the plurality of pellets have a difference in density of less than 10%.

The GTR of the present invention may be extracted from a replacement source of rubber, scrap, old, or worn tires which have been shredded and the non-rubber components thereof, such as tire belts, tire beads and fabric ply, then removed. The tires can be from passenger vehicles, buses, trucks, and the like and can be of a bias ply construction or of a radial ply construction. The major rubber components of such tires are generally natural rubber, polyisoprene, synthetic isoprene, polybutadiene, styrene-butadiene rubber, halobutyl rubber, polyisobutylene, and the like. Such cured rubber which contains various additives therein is ground into fine sized particles and recycled by replacing generally an equivalent amount of a rubber otherwise used in the formulation of a tire component rubber. The above tires may contain conventional or suitable amounts of typical additives known to those skilled in the art such as one or more types of carbon black; curing aids such as sulfur or sulfur containing compounds; various accelerators, such as amines, disulfides, guanidines, thioureas, thiazoles, thiuramms, sulfenamides, dithiocarbamates, and the like. Other additives include silica; silica coupling agents; various oils such as aromatic, naphthenic, or paraffinic; various antioxidants and antiozonants such as various phenylenediamines; various aliphatic acids such as stearic acid; zinc oxide; various waxes such as micro crystalline waxes; various peptizers; and the like. Various fillers can also be utilized such as clay, for example kaolin clay, and the like. For a detailed list of additives, see U.S. Pat. No. 6,265,454, which is hereby incorporated by reference in its entirety.

In as much as recycled materials can be employed, the GTR may include fillers, antioxidants, stabilizers, rubber processing oils, lubricants, anti-blocking agents, waxes, foaming agents, pigments, coupling agents for the fillers and other processing aids known to the rubber compounding art. The GTR can also include minor amounts of short fibers derived from the tire cords of the waste or used tires.

In one embodiment of the present invention, the GTR (e.g., tire rubber) may contain various additives and may be ground into fine size particles such as 90 mesh or smaller, 120 or smaller, and in one embodiment, 200 U.S. Standard Mesh or smaller. Any rubber grinding method or process can be utilized so long as the rubber is not scorched, degraded, or otherwise damaged during grinding thereof. A method of grinding the rubber is in the presence of water, which keeps the rubber temperature low, as well as extinguishes any possibility of a fire. A detailed description of such a grinding method and other exemplary grinding methods are set forth in U.S. Pat. Nos. 4,374,573; 4,714,201; 5,238,194; and 5,411,215, which are hereby incorporated by reference in their entirety. A particularly preferred method is cryogenically grinding the tire rubber. The method may include, in one embodiment, cryo-grinding the plurality of pellets. In one aspect, the average size of the pellets is less than about 500 microns. In one embodiment, the average particle size is greater than about 50 microns. In another embodiment, the GTR particle size is about 25 microns to about 100 microns.

In one embodiment of the present invention, the elastomeric polymer comprises a polymer having a repeating unit of Formula (I),

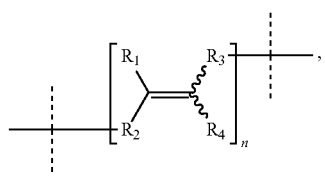
(I)

wherein $R_1$ is hydrogen or substituted or unsubstituted $C_1$-$C_6$ alkyl;
$R_2$ is a substituted or unsubstituted $C_1$-$C_6$ alkylene;
$R_3$ is a substituted or unsubstituted $C_1$-$C_6$ alkylene;
$R_4$ is hydrogen or substituted or unsubstituted $C_1$-$C_6$ alkyl;
wherein the optional substituents of $R_1$, $R_2$, $R_3$, and $R_4$ are present from 1 to 3 times for each of $R_1$, and $R_4$, and from 1 to 2 times for $R_2$, and $R_3$, with each substituent selected independently at each occurrence thereof from the group consisting of halogen, hydroxyl, $C_{1-6}$ alkyl, $C_{1-6}$ alkoxy, aryl, heteroaryl, and heterocyclyl;
wherein n is an integer from 1 to 10,000,000; each  indicates a bond with undefined geometric isomerism, and each

represents a possible point of attachment to an adjacent repeating unit, or
a polymer having a repeating unit of Formula (II)

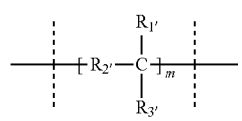
(II)

wherein $R_{1'}$ is selected from the group consisting of hydrogen and substituted or unsubstituted $C_1$-$C_6$ alkyl;
$R_{2'}$ is a substituted or unsubstituted $C_1$-$C_6$ alkylene;
$R_{3'}$ is selected from the group consisting of hydrogen, substituted or unsubstituted $C_1$-$C_6$ alkyl, and substituted or unsubstituted $C_1$-$C_6$ alkenyl and;

wherein the optional substituents of $R_{1'}$, $R_{2'}$, and $R_{3'}$ are present from 1 to 3 times for each of $R_{1'}$, and $R_{3'}$ and from 1 to 2 times for $R_{2'}$, with each substituent being selected independently at each occurrence thereof from the group consisting of halogen, hydroxyl, $C_{1-6}$ alkyl, $C_{1-6}$ alkoxy, aryl, heteroaryl, and heterocyclyl;
wherein m is an integer from 1 to 10,000,000; and each

represents a possible point of attachment to an adjacent repeating unit, or mixtures of the polymers of Formula (I) and Formula (II), wherein the plurality of pellets comprising GTR and the compound of Formula (I), and/or (II) are mixed with the asphalt component.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "alkyl" means an aliphatic hydrocarbon group which may be straight or branched having about 1 to about 100 carbon atoms in the chain. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

As used herein, the term "alkane" refers to aliphatic hydrocarbons of formula $C_nH_{2n+2}$, which may be straight or branched having about 1 to about 100 (e.g., 1-2, 1-3, 1-4, 1-5, 1-6, 1-7, 1-8) carbon atoms in the chain. Branched means that one or more lower alkyl groups such as methyl, ethyl, or propyl are attached to a linear alkyl chain. Exemplary alkanes include methane, ethane, n-propane, i-propane, n-butane, t-butane, n-pentane, and 3-pentane. The term "alkylene" refers to a divalent group formed from an alkane by removal of two hydrogen atoms. Exemplary alkylene groups include, but are not limited to, divalent groups derived from the alkanes described above.

The term "alkenyl" means an aliphatic hydrocarbon group containing a carbon—carbon double bond and which may be straight or branched having about 2 to about 100 carbon atoms in the chain. Particular alkenyl groups have 2 to about 20 carbon atoms in the chain. Branched means that one or more lower alkyl groups such as methyl, ethyl, or propyl are attached to a linear alkenyl chain. Exemplary alkenyl groups include ethenyl, propenyl, n-butenyl, and i-butenyl. The term "alkenyl" may also refer to a hydrocarbon chain having 2 to 6 carbons containing at least one double bond and at least one triple bond.

The term "halogen" means fluoro, chloro, bromo, or iodo.

The term "alkoxy" means groups of from 1 to 8 carbon atoms of a straight, branched, or cyclic configuration and combinations thereof attached to the parent structure through an oxygen. Examples include methoxy, ethoxy, propoxy, isopropoxy, cyclopropyloxy, cyclohexyloxy, and the like. Lower-alkoxy refers to groups containing one to four carbons. For the purposes of the present patent application, alkoxy also includes methylenedioxy and ethylenedioxy in which each oxygen atom is bonded to the atom, chain, or ring from which the methylenedioxy or ethylenedioxy group is pendant so as to form a ring. Thus, for example, phenyl substituted by alkoxy may be, for example,

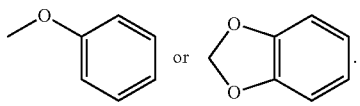

As used herein, "heterocyclyl" refers to a stable 3- to 18-membered ring (radical) which consists of carbon atoms and from one to five heteroatoms selected from the group consisting of nitrogen, oxygen, and sulfur. For purposes of this application, the heterocycle may be a monocyclic, or a polycyclic ring system, which may include fused, bridged, or spiro ring systems; and the nitrogen, carbon, or sulfur atoms in the heterocycle may be optionally oxidized; the nitrogen atom may be optionally quaternized; and the ring may be partially or fully saturated. Examples of such heterocycles include, without limitation, azepinyl, azocanyl, pyranyl dioxanyl, dithianyl, 1,3-dioxolanyl, tetrahydrofuryl, dihydropyrrolidinyl, decahydroisoquinolyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, 2-oxoazepinyl, oxazolidinyl, oxiranyl, piperidinyl, piperazinyl, 4-piperidonyl, pyrrolidinyl, pyrazolidinyl, thiazolidinyl, tetrahydropyranyl, thiamorpholinyl, thiamorpholinyl sulfoxide, and thiamorpholinyl sulfone. Further heterocycles and heteroaryls are described in Katritzky et al., eds., *Comprehensive Heterocyclic Chemistry: The Structure, Reactions, Synthesis and Use of Heterocyclic Compounds*, Vol. 1-8, Pergamon Press, N.Y. (1984), which is hereby incorporated by reference in its entirety.

The term "monocyclic" used herein indicates a molecular structure having one ring.

The term "polycyclic" or "multi-cyclic" used herein indicates a molecular structure having two or more rings, including, but not limited to, fused, bridged, or spiro rings.

The term "aryl" means an aromatic monocyclic or multi-cyclic (polycyclic) ring system of 6 to about 19 carbon atoms, or of 6 to about 10 carbon atoms, and includes arylalkyl groups. The ring system of the aryl group may be optionally substituted. Representative aryl groups include, but are not limited to, groups such as phenyl, naphthyl, azulenyl, phenanthrenyl, anthracenyl, fluorenyl, pyrenyl, triphenylenyl, chrysenyl, and naphthacenyl.

The term "heteroaryl" means an aromatic monocyclic or multi-cyclic ring system of about 5 to about 19 ring atoms, or about 5 to about 10 ring atoms, in which one or more of the atoms in the ring system is/are element(s) other than carbon, for example, nitrogen, oxygen, or sulfur. In the case of multi-cyclic ring system, only one of the rings needs to be aromatic for the ring system to be defined as "heteroaryl". Particular heteroaryls contain about 5 to 6 ring atoms. The prefix aza, oxa, thia, or thio before heteroaryl means that at least a nitrogen, oxygen, or sulfur atom, respectively, is present as a ring atom. A nitrogen, carbon, or sulfur atom in the heteroaryl ring may be optionally oxidized; the nitrogen may optionally be quaternized. Representative heteroaryls include pyridyl, 2-oxo-pyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, pthalazinyl, quinoxalinyl, 2,3-dihydro-benzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like.

"Unsubstituted" atoms bear all of the hydrogen atoms dictated by their valency.

The term "substituted" or "substitution" of an atom means that one or more hydrogen on the designated atom is replaced with a selection from the indicated group, provided that the designated atom's normal valency is not exceeded and the identity of each substituent is independent of the others. Up to three H atoms in each residue are replaced with alkyl, halogen, haloalkyl, hydroxy, lower alkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture, and formulation into an efficacious therapeutic agent.

Compounds described herein may contain one or more asymmetric centers and may thus give rise to enantiomers, diastereomers, and other stereoisomeric forms. Each chiral center may be defined, in terms of absolute stereochemistry, as (R)- or (S)-. The present invention is meant to include all such possible isomers, as well as mixtures thereof, including racemic and optically pure forms. Optically active (R)- and (S)-, (-)- and (+)-, or (D)- and (L)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

The term "copolymer" refers to a polymer derived from more than one species of monomer.

The term "alternating copolymer" or "alternating polymer" refers to a copolymer consisting of two or more species of monomeric units that are arranged in an alternating sequence (in which every other building unit is different $(-M_1M_2-)_n$.

The term "random copolymer" or "random polymer" refers to a copolymer in which there is no definite order for the sequence of the different building blocks ($-M_1M_2M_1M_1M_2M_1M_2M_2-$).

The term "block copolymer" or "block polymer" refers to a macromolecule consisting of long sequences of different repeat units. Exemplary block polymers include, but are not limited to $A_nB_m$, $A_nB_mA_m$, $A_nB_mC_k$, or $A_nB_mC_kA_n$.

The term "elastomeric polymer" refers to elastomers or rubbers that have properties similar to vulcanized natural rubber (cis-1,4-polyisoprene), for example, stretch under tension and retract relatively quickly to approximately the original length when released. The term "elastomeric polymer" includes cross-linkable polymers, that when cross-linked, have properties similar to vulcanized natural rubber.

Elastomeric polymers that can be used in accordance with the present invention include a natural rubber, a modified natural rubber, a synthetic rubber, and any combination thereof. Examples of natural and synthetic rubbers are described in detail in Chapters 2 and 3 of Ullmann's Encyclopedia of Industrial Chemistry, which are hereby incorporated by reference in their entirety. See Greve et al., Rubber, 2. Natural, ULLMANN'S ENCYCLOPEDIA OF INDUSTRIAL CHEMISTRY 31: 583-596 (2012) and Threadingham et al., Rubber, 3. Synthetic Rubbers, Introduction and Overview, ULLMANN'S ENCYCLOPEDIA OF INDUSTRIAL CHEMISTRY 31:597-622 (2012), both of which are hereby incorporated by reference in their entirety.

Elastomeric polymers that can be used in accordance with the present invention include, but are not limited to, natural rubber ("NR"), polyisoprene rubber ("PIR"), styrene-butadiene rubber ("SBR"), polychloroprene ("PCR"), polybutadiene rubber ("PBR"), polyisobutylene rubber ("PIBR"), nitrile rubber ("NBR"), carboxylated nitrite rubber ("XNBR"), butyl rubber ("IIR"), brominated isobutylene-isoprene copolymers with bromine contents of 0.1 to 10 wt. % ("BIIR"), chlorinated isobutylene-isoprene copolymers with chlorine contents of 0.1 to 10 wt. % ("CIIR"), hydrogenated or partially hydrogenated nitrite rubber ("HNBR"), styrene-isoprene-butadiene rubber ("SIBR"), styrene-butadiene-acrylonitrile rubber ("SNBR"), ethylene propylene diene rubber ("EPDM"), ethylene propylene copolymer ("EPM"), ethylene vinyl acetate rubber ("EVM"), silicone rubber ("QM"), fluoro elastomer ("FKM"), ethylene acrylate rubber ("AEM"), chlorinated polyethylene ("CM"), chlorosulfonated rubber ("CSM"), polyurethane rubber, and polysulfide rubber, and any mixtures thereof. These elastomeric polymers can be cross-linked with sulfur, peroxides, or similar agents. In one embodiment, the polymer is selected from a group including, but not necessarily limited to, latex rubber, waste water-based paint (latex paint), crumb rubber, chemically treated crumb rubber, and mixtures thereof. In one embodiment, the polymer used is selected from a group including, but not necessarily limited to, polystyrene ("PS"), high impact resistant polystyrene ("HIPS"), poly(acrylonitrile-co-butadiene-co-styrene) ("ABS"), poly(phenylene oxide) ("PPO"), glass filled polyethylene terephthalate ("GF PET"), poly(ethylene terephthalate) ("PET"), acrylic, polyester, and any mixtures thereof. This includes either virgin or recycled materials.

In one embodiment of the present invention, the elastomeric polymer is selected from the group consisting of a polyisoprene rubber, polybutadiene rubber, and polyisobutylene rubber. In another embodiment, the elastomeric polymer is a polymer of Formula (I) selected from the group consisting of cis-1,4-polyisoprene and trans-1,4-polyisoprene. In yet another embodiment, the elastomeric polymer is a polymer of Formula (II) selected from the group consisting of 1,2-addition polyisoprene and 3,4-addition polyisoprene. An example of a process for production of polyisoprene having a high cis product is described in U.S. Pat. No. 3,900,456, which is hereby incorporated by reference in its entirety; see also Hayashi et al., "Monomer Unit Sequence Distribution in Partly-Epoxidized Trans-1,4-Polyisoprene," *Polymer Journal* 13:215-223 (1981), which describes trans-1,4-polyisoprene and is hereby incorporated by reference in its entirety.

Various methods are described in the literature for polymerizing elastomeric polymers such as polyisoprene rubber, polybutadiene rubber, and polyisobutylene rubber. See, e.g., U.S. Pat. No. 3,060,989, which is hereby incorporated by reference in its entirety. For example, 1,3-butadiene can be polymerized by various methods, including emulsion polymerization, alkali metal-catalyzed polymerization, and alfin catalyzed polymerization. Emulsion polymerization of 1,3-butadiene gives a polymer with from about 60 to about 80 percent trans 1,4-addition, from about 5 to about 20 percent cis 1,4-addition, and from about 15 to about 20 percent 1,2-addition. Sodium-catalyzed poly-butadiene has from about 60 to about 75 percent 1,2-addition, the remainder being cis and trans 1,4-addition. When potassium and other alkali metals are employed as catalyst, the latter ratios may vary to some degree. Alfin-catalyzed polybutadiene has from about 65 to about 75 percent trans 1,4-addition, from about 5 to about 10 percent cis 1,4-addition, and from about 20 to about 25 percent 1,2-addition.

Solution polymerization can also be utilized in the formation of the elastomeric polymers utilized in the present invention. The solution polymerization of isoprene monomer into cis-1,4-polyisoprene rubber with a preformed titanium catalyst system is described in U.S. Pat. No. 3,386,983, which is hereby incorporated by reference in its entirety. The solution polymerization of 1,3-butadiene monomer into high cis-1,4-polybutadiene rubber with a catalyst system consisting of (1) an organoaluminum compound, (2) an organonickel compound and (3) a hydrogen fluoride complex is described in U.S. Pat. No. 4,155,880, which is hereby incorporated by reference in its entirety. See U.S. Pat. No. 6,066,705, which is hereby incorporated by reference in its entirety.

The synthesis of polyisoprene is well known in the art and is further disclosed in U.S. Patent Appl. Pub. No. 2013/0165589; U.S. Pat. Nos. 7,592,409; 6,828,387; and 5,376,745, as well as WO 2002/048218 all of which are hereby incorporated by reference in their entirety. These syntheses utilize polymerization techniques such as reversible addition-fragmentation chain transfer (RAFT) polymerization, nitroxide-mediated polymerization (NMP), atom transfer radical polymerization (ATRP) and degenerative transfer (DT), and anionic polymerization.

Additionally in more recent years Neodymium salts activated with aluminum alkyl co-catalysts have been utilized to catalyze the polymerization of conjugated dienes. To date, many papers and patents have been published which describe variations and improvements to the original systems (see U.S. Pat. Nos. 3,297,667, 3,676,441, and 3,794,604, which are hereby incorporated by reference in their entirety). Much of this work was driven by the eventual commercialization of high cis-polybutadiene in the 1980s for the use in tire applications (see U.S. Pat. Nos. 4,242,232, 4,260,707, 4,699,960, 4,444,903, and U.S. Patent Appl. Publ. No. 2005/0137338, all of which are hereby incorporated by reference in their entirety).

The synthesis of trans polybutadiene is disclosed in U.S. Pat. No. 6,018,007, which is hereby incorporated by reference in its entirety, disclosing a system comprising: (a) an organolithium compound; and, (b) an organic acid salt of lanthanide series element as a catalyst for the polymerization of conjugated diene monomers is utilized in the formation of 1,4-trans-polybutadiene. Additionally Japanese Patent Application No. 67187-1967, which is hereby incorporated by reference in its entirety, discloses a catalyst system and technique for synthesizing trans-polybutadiene consisting of 75 to 80% trans-1,4-structure and 20 to 25% 1,2-structure. The catalyst system described by this reference consists of a cobalt compound having a cobalt organic acid salt or organic ligand, an organoaluminum compound and phenol or naphthol. By utilizing the catalyst system and techniques of this invention, trans-polybutadiene can be synthesized in a continuous process with only minimal amounts of gel formation.

The synthesis of polyisobutylene, also known as butyl rubber, is also well known in the art and is disclosed in U.S. Pat. Nos. 4,316,973; 4,908,421; 4,910,261; 4,910,321; 4,929,683; and 4,943,616, all of which are hereby incorporated by reference in their entirety. These syntheses utilize multiple polymerization techniques such living carbocatic polymerization and living cationic polymerization.

The elastomeric polymer of the asphalt product of the present invention may, in one embodiment, have a molecular weight ranging from between about 1 kD to about 500 kDa. For example, the molecular weight may be up to about 1 kD, up to about 2 kD, up to about 3 kD, up to about 4 kD, up to about 5 kD, up to about 10 kD, up to about 20 kD, up to about 30 kD, up to about 40 kD, up to about 50 kD, up to about 60 kD, up to about 70 kD, up to about 80 kD, up to about 90 kD, up to about 100 kD, up to about 125 kD, up to about 150 kD, up to about 175 kD, up to about 200 kD, up to about 225 kD, up to about 250 kD, up to about 275 kD, up to about 300 kD, up to about 325 kD, up to about 350 kD, up to about 375 kD, up to about 400 kD, up to about 425 kD, up to about 450 kD, up to about 475 kD, or up to about 500 kD. For example, in one embodiment, the molecular weight of the elastomeric polymer ranges between 60 kDa to 300 kDa. In another embodiment, the elastomeric polymer has a molecular weight ranging from between 5 kDa to 40 kDa. The elastomeric polymer may have a high or a low molecular weight.

The GTR and the elastomeric polymer may form a plurality of pellets in accordance with the present invention. The pellets are combined with the asphalt component to form an asphalt product. The asphalt product of the present invention may contain anywhere from 0.10% to 100% by weight plurality of pellets comprising a mixture of GTR and an elastomeric polymer. More preferably, the asphalt product may contain from about 1% by weight to about 60% by weight plurality of pellets, more preferably between about 5% by weight to about 50% by weight plurality of pellets, and most preferably between about 12% by weight to about 15% by weight plurality of pellets. For example, the plurality of pellets may be up to about 0.1 wt %, 1 wt %, 2 wt %, 3 wt %, 4 wt %, 5 wt %, 6 wt %, 7 wt %, 8 wt %, 9 wt %, 10 wt %, 12 wt %, 13 wt %, 14 wt %, 15 wt %, 20 wt %, 25 wt %, 30 wt %, 35 wt %, 40 wt %, 45 wt %, 50 wt %, 55 wt %, or 60 wt % of the asphalt product. In one embodiment, the plurality of pellets is between about 12 wt % to about 15 wt % of the asphalt product.

The asphalt product of the present invention may have a softening point anywhere from 10° C. to 100° C. For example, the softening point can be about 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., or 100° C. The softening point of the asphalt product may be within a range of between about 20° C. to about 90° C., between about 30° C. to about 90° C., between about 40° C. to about 90° C., between about 50° C. to about 90° C., between about 60° C. to about 90° C., between about 70° C. to about 90° C., or between about 80° C. to about 90° C. In one embodiment, the softening point of the asphalt product is between 55° C. to 85° C. The ratio of the elastomeric polymer to the GTR ratio in the plurality of pellets in the asphalt product may, in one embodiment, be anywhere between 1:1 to 7:1.

Softening point may be measured by a Ring-and-Ball Apparatus ("R&B") (ASTM D 36-0, which is hereby incorporated by reference in its entirety. Since asphalt does not have a distinct melting point, softening point by R&B is a way to characterize a viscosity shift. R&B according to the present invention measures the point where the asphalt is fluid enough that it can no longer support a small metal ball. According to the R&B test of the present invention, the asphalt is heated and poured into a square-shouldered brass ring, approximately 23.0 mm and 19.8 mm for the upper and lower diameters, respectively. The excess asphalt may be removed from the top to create a level surface. In a beaker of boiled distilled water, specimen ring may be placed into a holder so that it is 15 mm above the bottom of the beaker. A steel ball (9.5 mm diameter, 3.50 g) may be placed into the water and the asphalt ring and ball allow for the temperature to equilibrate. Using a ball-centering guide, the ball may be placed in the center of the asphalt ring. The water may be heated at a rate of 5° C./min. The time when the steel ball touches the bottom of the beaker is recorded. This standard test method for the softening point of bitumen (ASTM D 36-0) is hereby incorporated by reference in its entirety. This test method may cover the determination of the softening point of bitumen in the range from 30 to 157° C. (86 to 315° F.) using the ring-and-ball apparatus immersed in distilled water (30 to 80° C.) or USP glycerin (above 80 to 157° C.).

The asphalt product may have a density of between about 0.85 g/cm$^3$ and about 1.25 g/cm$^3$. In one embodiment, the density may be less than 1.11 g/cm$^3$. Alternatively, the asphalt product may have a density of between about 0.96 g/cm$^3$ and about 1.11 g/cm$^3$ or between about 1.019 g/cm$^3$ and about 1.052 g/cm$^3$. For example, the specific gravity may be, but is not limited to, about 0.85 g/cm$^3$, 0.86 g/cm$^3$, 0.90 g/cm$^3$, 0.95 g/cm$^3$, 0.96 g/cm$^3$, 1.00 g/cm$^3$, 1.010 g/cm$^3$, 1.019 g/cm$^3$, 1.020 g/cm$^3$, 1.025 g/cm$^3$, 1.030 g/cm$^3$, 1.035 g/cm$^3$, 1.040 g/cm$^3$, 1.045 g/cm$^3$, 1.050 g/cm$^3$, 1.052 g/cm$^3$, 1.060 g/cm$^3$, 1.070 g/cm$^3$, 1.080 g/cm$^3$, 1.090 g/cm$^3$, 1.100 g/cm$^3$, or 1.110 g/cm$^3$.

According to the present invention, the difference in density between the asphalt component and the plurality of pellets is less than 10%. For example, the difference in density between the asphalt component and the plurality of pellets may be less than about 9%, less than about 8%, less than about 7%, less than about 6%, less than about 5%, less than about 4%, less than about 3%, less than about 2%, or less than about 1%. In one embodiment, the difference in density is less than 5%. In another embodiment, the difference in density is less than 1%. In a preferred embodiment, there is no difference in density of the asphalt component and the plurality of pellets (e.g., the difference in density is zero percent). The present invention provides a way for GTR (which would otherwise sink in asphalt without constant agitation) to swell with a low density, elastomeric polymer so that the density of the elastomeric polymer matches that of the asphalt component to which it is combined. Density measurements in accordance with the present invention may be performed according to ASTM D297-15 and ASTM D70-09 at room temperature. A clean, dry pycnometer may be weighed to the nearest 0.001 g, then filled completely with methanol and weighed again. The sample may be added to pycnometer until it is approximately three quarters full and weighed again. Equation 1 may be used to calculate density.

$$\text{Density}\left(\frac{\text{g}}{\text{cm}^3}\right) = \frac{0.9971 * A}{A - (B - C)} * D \qquad \text{Equation 1}$$

In one embodiment, the asphalt product further includes a mineral aggregate. A mineral aggregate may be added to the asphalt product to modify its rheology and temperature susceptibility. The asphalt product may bind to the mineral aggregate at an air void content of from about 1% to about 50% according to procedures known to one of skill in the art. The mineral aggregate may include, but is not limited to, sand, gravel, limestone, quartzite, crushed stone, slag, and mixtures thereof. The mineral aggregate particles of the present invention can include calcium-based aggregates, for example, limestone, siliceous based aggregates and mixtures thereof. Aggregates can be selected for asphalt paving applications based on a number of criteria, including physical properties, compatibility with the bitumen to be used in the construction process, availability, and ability to provide a finished pavement that meets the performance specifications of the pavement layer for the traffic projected over the design life of the project. The product may be free of deleterious materials such as those within an aggregate stockpile that are weak, reactive, or unsound as well as free of substantial voids within the aggregate.

In one embodiment, the asphalt product is in the form of asphalt concrete used in pavement. In another embodiment, the asphalt product is in the form of an asphalt mixture. The asphalt mixture may further include fiberglass and a mineral aggregate including at least one of lime dust and granular ceramic material. Mineral aggregates of the present invention may include elements of less than 0.063 mm and optionally aggregates originating from recycled materials, sand with grain sizes between 0.063 mm and 2 mm and optionally grit, containing grains of a size greater than 2 mm, and optionally aluminosilicates. Aluminosilicates are inorganic compounds based on aluminium and sodium silicates or other metal such as potassium or calcium silicates. Aluminosilicates reduce the viscosity of the warm-mix and are in the form of a powder and/or granulates. The term granulates refers to mineral and/or synthetic granulates, especially coated material aggregates, which are conventionally added to bituminous binders for making mixtures of materials for road construction.

The asphalt product or mixture can also include manufactured sand, e.g., crushed and washed mined aggregate, and also a blend of ceramic material and manufactured sand. Likewise, the product may include modified asphalt containing a Fischer-Tropsch wax, polyethylene wax, and/or oxidized polyethylene wax. Wax modifiers that can be usefully employed in the context of the present invention include, but are not limited to, waxes of vegetable (e.g., carnuba wax), animal (e.g., beeswax) mineral (e.g., Montan™ wax from coal, Fischer Tropsch wax from coal) or petroleum (e.g. paraffin wax, polyethylene wax, Fischer-Tropsch wax from gas) origin including oxidized waxes; amide waxes (e.g. ethylene bis stearamide, stearyl amide, stearyl stearamide); fatty acids and soaps of waxy nature (e.g., aluminum stearate, calcium stearate, fatty acids); other fatty materials of waxy nature (fatty alcohols, hydrogenated fats, fatty esters etc) with the ability to stiffen asphalt, and the like. The above products are basically soluble in the asphalt at warm mix temperatures, to make a homogeneous binder, and/or will melt at the temperature of the mix and the ingredients will disperse/dissolve into the mixture. The wax and resin ingredients will generally act to improve cohesion properties of the asphalt, while the adhesion promoter will improve the adhesion of the asphalt to the aggregate. Together the ingredients provide improved resistance to water damage. The present invention may employ a Fischer Tropsch Wax derived from coal or natural gas or any petroleum feedstock. The process entails the gasification of the above feedstock by partial oxidation to produce carbon monoxide under high temperature and pressure and reaction of the resultant carbon monoxide with hydrogen under high temperature and pressure in the presence of a suitable catalyst (such as iron compound or cobalt compound) for example as in the case of processes employed by Shell and Sasol. The congealing point of the wax is between 68° C. and 120° C. with a Brookfield viscosity at 135° C. in the range of 8 to 20 cPs. For example, the congealing point of the wax may be between 80° C. and 120° C. Alternatively, the congealing point of the wax may be between 68° C. and 105° C. See U.S. Patent Publ. No. 2013/0186302 to Naidoo et al., which is hereby incorporated by reference in its entirety.

The asphalt product can, in one embodiment, further include a carboxyl additive. Examples of carboxyl additives include, but are not limited to, tall oil and vegetable oils, such as linseed oil and soybean oil and the like. The carboxyl may be added at a concentration of up to about 10% by weight of the asphalt product or, more preferably, the carboxyl is added at a concentration of from about 0.10% to about 10% by weight of the asphalt product.

The asphalt product may optionally include a polymer additive. Any suitable polymer or mixture of different polymers can be used in producing polymer-modified asphalt. The asphalt product can include, for example, a polymer additive such as polyethylenes, oxidized polyethylenes, polyolefins, PE homopolymers, styrene/butadiene/styrene triblock copolymer, styrene/ethylene-butylene/styrene triblock copolymer, epoxy modified acrylate copolymer, ethylene/vinyl acetate copolymer, or mixtures thereof. The polymer additive can include low molecular weight polymers, such as low, medium, or high density polyethylenes having a maximum viscosity of 1000 cps at 140° C. Other suitable polymers would include ethylenes and polypropylenes with melting points below 140° C. In one embodiment, the product may further include a styrene-butadiene type polymer. Styrene-butadiene type polymers may, in certain embodiments, include SB rubber, SBS linear type, SBS radial type, and SB sulphur linked type polymers, and the like. Polymers, such as styrene butadiene polymers, can be used to adjust or manipulate certain characteristics of the resulting hardened asphalt product. Styrene butadiene modified asphalts may demonstrate greater ability to withstand temperature extremes. For example, styrene butadiene modified asphalt is more viscous at high temperatures and therefore resistant to rutting or shoving, and more ductile at low temperatures and therefore less brittle, more resistant to fatigue cracking, and provide a more adhesive binder. According to certain embodiments, the asphalt product may be used as a binder material in asphalt applications.

The polymer additive in the asphalt product may be added at a concentration of, for example, up to about 1%, up to about 5%, up to about 10%, up to about 15%, up to about 20%, up to about 25%, and up to about 50% of the asphalt product.

The asphalt product may include from about 99% to about 1% by weight asphalt (and when the asphalt contains a polymer-modified asphalt, from 0% to about 25% by weight styrene-butadiene type polymer), about 1% to about 99% by weight asphalt product, and optionally from about 0.10% to about 10% by weight carboxyl additive.

In an embodiment, the asphalt product can be mixed with water and a surfactant and mechanically agitated in, for example, a shear mill, to form an emulsion. Suitable emulsion-forming surfactants are known to those of skill in the art. The emulsified asphalt binder can be used as weatherproofing sealant or as an adhesive bonding layer between two surfaces.

In some embodiments, the asphalt product of the present invention can be used as a main component in a thermoplastic elastomer composition, to improve the thermoplastic and elastic properties of the composition. To form an elastomeric composition, the asphalt product can be further vulcanized, cross-linked, compatibilized, and/or compounded with one or more other materials, such as other elastomer, additive, modifier and/or filler. The resulting elastomer can be used as a rubber composition, in various industries. The elastic recovery is improved by the various formulations of the present invention.

In one embodiment, the asphalt product can be used in an adhesive composition. The adhesive composition may further comprise a tackifier and/or a plasticizer.

A second aspect of the present invention relates to a pellet comprising a ground tire rubber ("GTR") and an elastomeric polymer mixed with the GTR. The GTR has a density of less than 1.12 g/cm$^3$.

The asphalt component, elastomeric polymer, GTR, and density of the pellet in this aspect of the invention are consistent with those elements described in the previous aspect.

The density of the GTR in the present aspect may be less than 1.12 g/cm$^3$. For example, the GTR density may be less than about 1.11 g/cm$^3$, less than about 1.10 g/cm$^3$, less than about 1.09 g/cm$^3$, less than about 1.08 g/cm$^3$, less than about 1.07 g/cm$^3$, less than about 1.06 g/cm$^3$, less than about 1.05 g/cm$^3$, less than about 1.04 g/cm$^3$, less than about 1.03 g/cm$^3$, less than about 1.02 g/cm$^3$, less than about 1.01 g/cm$^3$, less than about 0.9 g/cm$^3$, less than about 0.8 g/cm$^3$, less than about 0.7 g/cm$^3$, less than about 0.6 g/cm$^3$, less than about, 5 g/cm$^3$, less than about 0.4 g/cm$^3$, less than about 0.3 g/cm$^3$, less than about 0.2 g/cm$^3$, or less than about 0.1 g/cm$^3$. In one embodiment, the density of the pellet is between 1.02 g/cm$^3$ to 1.12 g/cm$^3$.

A third aspect of the present invention relates to a method of producing an improved asphalt. The method includes providing an asphalt component; providing a plurality of pellets each comprising a mixture of: a ground tire rubber ("GTR") and an elastomeric polymer mixed with the GTR; and mixing the asphalt component with the plurality of pellets under conditions effective to produce an asphalt product. The asphalt component and the plurality of pellets have a difference in density of less than 10%.

The asphalt component, plurality of pellets, elastomeric polymer, GTR, and density of the improved asphalt in this aspect of the invention is consistent with those elements described in the previous aspects.

One way to mix the asphalt component with the plurality of pellets is by premixing the GTR and elastomeric polymer to form a plurality of pellets, then adding the plurality of pellets to an asphalt component, optionally by a hot liquified asphalt cement, and continuing the mixing at the same temperature range.

The mixing temperature can depend upon the qualities and characteristics of the asphalt. The mixing of the plurality of pellets with the asphalt is typically carried out at a temperature range of 50° C. to 200° C. For example, the mixing step may be carried out at between 60° C. to 150° C., between 60° C. to 140° C., between 60° C. to 120° C., between 50° C. to 100° C., between 100° C. to 150° C., between 100° C. to 200° C. In one embodiment, the mixing is carried out between 130° C. to 180° C. The mixing step may be carried out in a high-speed shear mill at a temperature of, for example, about 120° C., about 115° C., about 110° C., about 105° C., about 100° C., about 95° C., about 90° C., about 85° C., about 80° C., about 75° C., about 70° C., about 65° C., about 60° C., about 55° C., about 50° C., or any temperature in between. In one embodiment, mixing is carried out in a high-speed shear mill and, in one embodiment, at a temperature between 60° C. to 120° C.

The method of making the asphalt product may optionally include a heating step carried at a temperature of, for example, 145° C., 146° C., 147° C., 148° C., 149° C., 150° C., 151° C., 152° C., 153° C., 154° C., 155° C., or any temperature in between. In one embodiment, heating is carried out in a high-speed shear mill at 145° C. to 155° C. Whichever temperature is used, it is adequate for the asphalt product to mix with the plurality of pellets as described above and to produce an asphalt product with improved rheological properties compared to an asphalt product absent the elastomeric polymers.

In accordance with this and other aspects of the invention, the plurality of pellets may, in one embodiment, comprise a uniform dispersion of the asphalt component. Alternatively, the plurality of pellets may comprise a non-uniform dispersion of the asphalt component. For example, the non-uniform dispersion of the asphalt component may include dispersion of the pellets throughout the asphalt favoring the top, or the pellets going to the top of the asphalt.

A fourth aspect of the present invention relates to a method of paving a surface. The method includes: (a) providing a ground tire rubber ("GTR"); (b) providing an elastomeric polymer; (c) mixing the GTR and the elastomeric polymer to produce a GTR-elastomeric polymer mixture; (d) forming the GTR-elastomeric polymer mixture into a plurality of pellets; (e) mixing the plurality of pellets with an asphalt component, where the asphalt component and the plurality of pellets have a density difference of less than 10%; and (f) applying the mixture of the plurality of pellets and the asphalt component to a surface to be paved to form an applied paving material.

The asphalt product of this aspect of the present invention is in accordance with the previously described aspects of the invention.

In accordance with this aspect and the previously described aspects of the invention, the term asphalt includes but is not limited to straight-run asphalt, blowing asphalt, catalytic blowing asphalt, rubberized asphalt, asphalt compound, resin-mixed asphalt, and the like. The pellets of this invention can be obtained by methods known to those skilled the art, including, for example, the apparatus disclosed in U.S. Pat. No. 3,758,035, which is hereby incorporated by reference in its entirety.

The paving, according to one embodiment, may include a coating or sealing composition which can be applied to the roadway before, during, or after paving a surface. Any paving method for roads, bridges, floors, etc., can be carried out by using the method of this invention by mixing the asphalt product with crushed stone, gravel, sand or other aggregate, as described in detail in previous aspects.

Thus, any conventional aggregate material, for example, crushed stone, gravel, sand or blended mixtures thereof in specified ratios and quantities, may be mixed with the pellets on the working site to obtain the asphalt component. The pellets and the asphalt component may be mixed at the normal temperature and then the mixture may be heated or a pellet that was previously heated at a high temperature may be mixed with the asphalt component.

The method of the present invention can also be used for filling voids, joints, and cracks, among and between materials used in structures and buildings, for example, joints of wood block, asphalt block, brick pavement, portland cement, and concrete pavement. It is possible to apply the asphalt product of the present invention to voids, joints, or cracks, and then heat to seal the voids.

The asphalt product of the present invention can, in one embodiment, be emulsified in water to produce a liquid that can be easily pumped through pipes, mixed with an aggregate, or sprayed through nozzles. The asphalt product may be ground into globules of about 5 to 10 microns or less, and mixed with water and an emulsifying agent. The emulsifying agent can reduce the tendency of the asphalt and water to separate, and can be colloidal clay, soluble or insoluble silicates, soap, or other oils.

The asphalt product may also be pulverized to produce a powdered material. The product is crushed and passed through a series of fine mesh sieves to obtain uniform size granules in accordance with methods described above in previous aspects. The powered asphalt product can, for example, be mixed with road oil and aggregate for paving a surface. The heat and pressure in the road may amalgamate the powder with the aggregate and binding oil, and the substance may, in one embodiment, harden to a consistency similar to regular asphaltic concrete. For a detailed discussion of asphalt and paving applications, see U.S. Pat. Nos. 3,958,067 and 4,479,827, both of which are hereby incorporated by reference in their entirety.

The plurality of pellets, elastomeric polymer, GTR, and density of the improved asphalt in this aspect of the invention is consistent with those elements described in the previous aspects.

The asphalt component may be applied to any surface to be paved to form an applied paving material consistent with paving materials and applications described above. While the surface to be paved is specific to a particular paving environment, other applications of the invention will become apparent to those skilled in the art. Accordingly, an applied paving material should be interpreted broadly to include all varieties of asphalt, cement, concrete, soil, sand, stones, bituminous material and all other forms of in-place material.

The above disclosure generally describes the present invention. A more specific description is provided below in the following examples. The examples are described solely for the purpose of illustration and are not intended to limit the scope of the present invention. Changes in form and substitution of equivalents are contemplated as circumstances suggest or render expedient. Although specific terms have been employed herein, such terms are intended in a descriptive sense and not for purposes of limitation.

EXAMPLES

The following examples are intended to illustrate, but by no means are intended to limit, the scope of the present invention as set forth in the appended claims.

Example 1—Experimental Methods

Figures 2A, 2B:
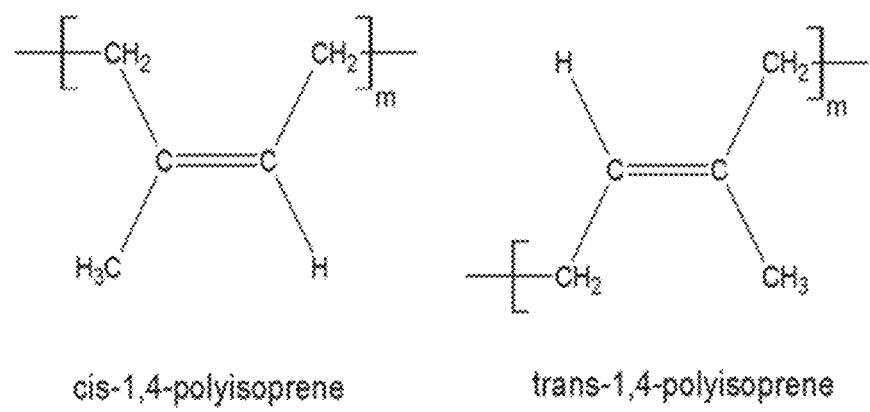
FIG. 2A-2B shows the chemical structure of cis-1,4-polyisoprene (FIG. 2A) and trans-1,4-polyisoprene (FIG. 2B).

This invention describes the modification of GTR's density using elastomeric polymers, such as polyisoprene (e.g., cis-1,4-polyisoprene as shown in FIG. 2A, and trans-1,4-polyisoprene as shown in FIG. 2B); polybutadiene; and polyisobutylene. GTR was blended with several different ratios of these elastomeric polymers to GTR and then mixed in asphalt (Marathon PG67-22) and tested using ASTM standards to measure Softening Point, Elastic Recovery, and Storage Stability.

Compounding Extrusion—200 mesh cryo-grounded GTR was compounded at 120° C. with polyisoprene (cis-1,4-polyisoprene (high molecular weight >60 KDa and low molecular weight <35 KDa) or trans-1,4-polyisoprene), polybutadiene (PB) with a molecular weight ~200 KDa, or polyisobutylene with a molecular weight ~79 KDa. Different blends were compounded with the final composition resulting as: 50/50 GTR/Polymer, 75/25 GTR/Polymer, 87.5/12.5 GTR/Polymer, and 93.75/6.25 GTR Polymer. The final compounded blends were pelletized.

Figure 4:
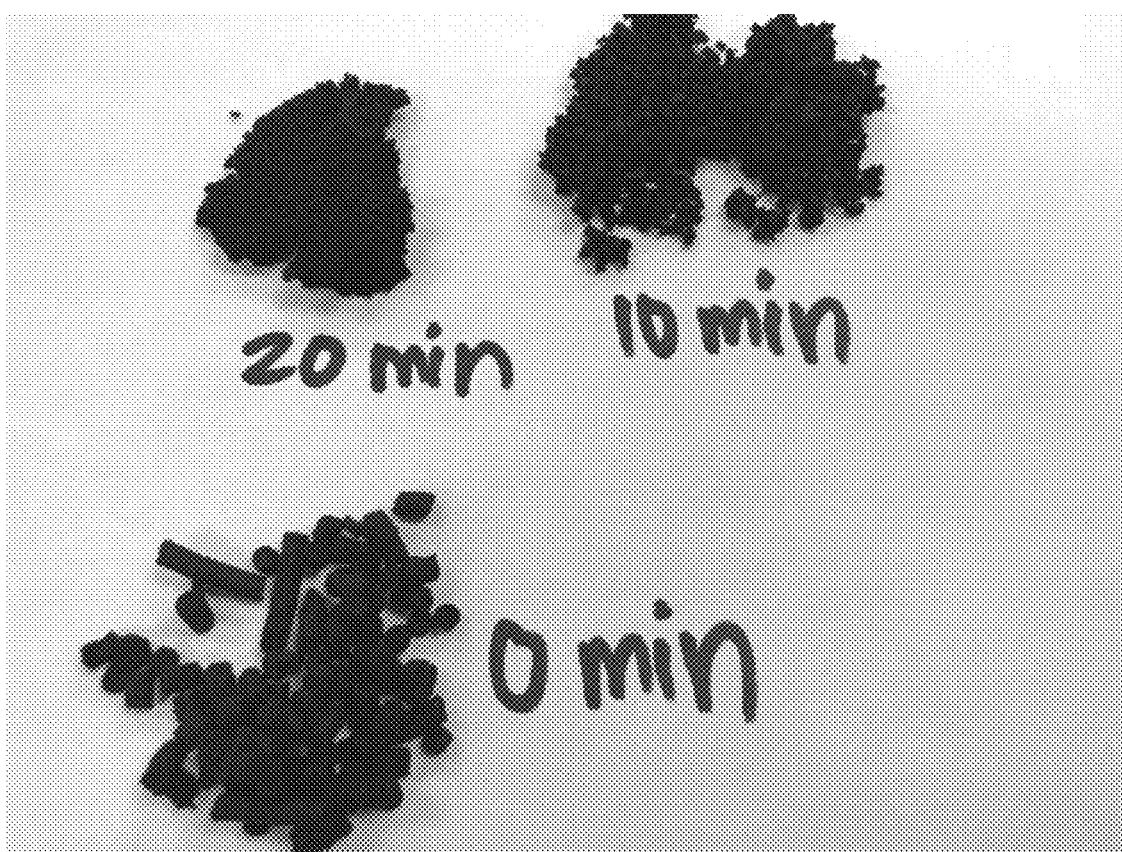
FIG. 4 is an image of the HMW polyisoprene ("PI") modified GTR after 0 minutes, 10 minutes, and 20 minutes in a cryo-grinder.

Cryo-Grinding—A set of extruded pelletized samples were then cryo-grounded using a freezer/mill at temperature of 77 K for 10 and 20 minutes at 15 cycles per second (see FIG. 4, which is an image of the HMW PI modified GTR after 0, 10 and 20 minutes in the cryo-grinder). Cryo-grinding will decrease particles size, thus helping in the blending and solubility of the compounded GTR into the asphalt.

Example 2—Test Methods

Storage Stability (ASTM D6930-10)—The asphalt is poured into a storage stability tube and placed in an oven at 163° C. for 48 hrs. After 48 hrs, the sample is transferred to a freezer for at least 8 hours. The tube is cut into thirds to test the top and bottom segments separately.

Softening Point (Ring-and-Ball Apparatus) (ASTMD 36-0)—Asphalt does not have a distinct melting point. Instead, the material gradually changes from solid to liquid. Softening point by ring-and-ball (R&B) is a way to characterize this viscosity shift. R&B measures the point where the asphalt is fluid enough that it can no longer support a small metal ball.

The asphalt is heated and poured into a square-shouldered brass ring, approximately 23.0 mm and 19.8 mm for the upper and lower diameters, respectively. The excess asphalt is removed from top to create a level surface. In a beaker of boiled distilled water, place the specimen ring into a holder so that it is 15 mm above the bottom of the beaker. A steel ball (9.5 mm diameter, 3.50 g) is placed into the water. The asphalt ring and ball allow the temperature to equilibrate. Using a ball-centering guide, the ball is placed in the center of the asphalt ring. The water is heated at a rate of 5° C./min. The time when the steel ball touches the bottom of the beaker is recorded. Measurements are done in triplicate.

The standard test method for softening point of bitumen (ASTM D 36-0) is hereby incorporated by reference in its entirety. This test method covers the determination of the softening point of bitumen in the range from 30 to 157° C.

[86 to 315° F.] using the ring-and-ball apparatus immersed in distilled water [30 to 80° C.] or USP glycerin (above 80 to 157° C.).

Bitumens are viscoelastic materials without sharply defined melting points; they gradually become softer and less viscous as the temperature rises. For this reason, softening points must be determined by an arbitrary and closely defined method if results are to be reproducible. The softening point is useful in the classification of bitumens, as one element in establishing the uniformity of shipments or sources of supply and is indicative of the tendency of the material to flow at elevated temperatures encountered in service.

Ring and Ball—Illinois Sep Test—The sample is carefully heated to avoid localized overheating, until sufficiently fluid to pour. The melted sample is strained through 300 m (50 mesh) and stir thoroughly. 50 grams is poured into thin wall aluminum tube having approximate dimension of 25 mm (1 in.) diameter×140 mm (5.5 in.) length. The excess tube is folded over two times and crimped to seal. The sealed tube is placed vertically in oven @163±6° C., and allowed to stand undisturbed for 48±1 hr. At the end of the heating period, the tube is removed and immediately placed in freezer at −7±6° C. (20±10° F.), keeping the tube in a vertical position at all times. The tube is left in the freezer for a minimum of 4 hours to completely solidify the sample. Upon removing the tube from the freezer, it is placed on a hard, flat surface and cut into 3 equal portions with a sharp spatula and a hammer. The top and bottom portions are placed into separate marked beakers and heated in a 163±6° C. (325±10° F.) oven until sufficiently fluid. Pieces of aluminum tube are removed, then stir thoroughly, and pour the top and bottom samples into marked softening point rings. The softening point of the top and bottom portions of the sample are determined simultaneously according to AASHTO T 53, which is incorporated by reference in its entirety.

Multiple Stress Creep Recovery (MSCR) (ASTMD7405-15)—MSCR is performed on a Dynamic Shear Rheometer. The sample is subjected to 1 second of constant stress, then 9 seconds of recovery. The sample goes through 10 conditioning cycles and 10 data collection cycles at a 0.1 kPa stress load, and then repeats the 20 cycles at 3.2 kPa stress load. The results of this test provide the non-recoverable creep compliance (Jnr) and percent recovery. These parameters indicate elastic response and resistance to permanent deformation, and the asphalt can be rated for Standard Traffic (S), Heavy Traffic (H), Very Heavy Traffic (V), or Extremely Heavy Traffic (E), see Table 1 below from AASHTO M322, which is hereby incorporated by reference in its entirety.

TABLE 1

| | Spec Base | Spec w/Tol | Tol | PG 46 | | PG 52 | | | | | | | PG 58 | | | | | | PG 64 | | | | | |
|---|---|---|---|---|---|---|---|---|---|---|---|---|---|---|---|---|---|---|---|---|---|---|---|---|
| Performance Grade[a] | | | | 46 | | 52 | | | | | | | 58 | | | | | | 64 | | | | | |
| Average 7-day max pavement design temp, °C.[b] | | | | -34 | -40 | -10 | -16 | -22 | -28 | -34 | -40 | -46 | -16 | -22 | -28 | -34 | -40 | -46 | -10 | -16 | -22 | -28 | -34 | -40 |
| Min pavement design temp, °C.[h] | 230 | 221 | 9 | 230 | | 230 | | | | | | | 230 | | | | | | 230 | | | | | |
| Flash Point Temp, T 48, min °C. | | | | | | | | | | | | | | | | | | | | | | | | |
| Viscosity, T 316[c]: max 3 Pa s test temp, °C. | 3.0 | 3.2 | 7.3% | 135 | | 135 | | | | | | | 135 | | | | | | 135 | | | | | |
| Dynamic Shear, T 315[d]: G*/sinδ, min 1.00 kPa[c] test temp @ 10 rad/s, °C. | 1.00 | 0.93 | 7% | 46 | | 52 | | | | | | | 58 | | | | | | 64 | | | | | |
| Rolling Thin Film Oven (T 240) | | | | | | | | | | | | | | | | | | | | | | | | |
| Mass Change, max, percent[f] | | | | 1.00 | | | | | | | | | | | | | | | | | | | | |
| MSCR, T 350: (Test Temperature °C.) | | | | | | | | | | | | | | | | | | | | | | | | |
| Standard Traffic "S" Jnr@3.2 kpa-1 Max 4.5 kPa-1 Jnrdiff max 75% | 4.5 | 5.49 | 22% | 46 | | 52 | | | | | | | 58 | | | | | | 64 | | | | | |
| Heavy Traffic "H" Jnr@3.2 kpa-1 Max 2.0 kPa-1 Jnrdiff max 75% | 2.0 | 2.44 | 22% | 46 | | 52 | | | | | | | 58 | | | | | | 64 | | | | | |
| Very Heavy Traffic "V" Jnr@3.2 kpa-1 Max 1.0 kPa-1 Jnrdiff max 75% | 1.0 | 1.39 | 39% | 46 | | 52 | | | | | | | 58 | | | | | | 64 | | | | | |
| Extremely Heavy Traffic "E" Jnr@3.2 kpa-1 Max 0.5 kPa-1 Jnrdiff max 75% | 0.5 | 0.695 | 39% | 46 | | 52 | | | | | | | 58 | | | | | | 64 | | | | | |
| % Recov. @ 3.2 kPa (Min). Heavy traffic "H" | 30 | 24.6 | 18% | 46 | | 52 | | | | | | | 58 | | | | | | 64 | | | | | |
| % Recov. @ 3.2 kPa (Min). Very Heavy traffic "V" | 55 | 45.1 | 18% | 46 | | 52 | | | | | | | 58 | | | | | | 64 | | | | | |
| % Recov. @ 3.2 kPa (Min). Extremely Heavy traffic "E" | 75 | 61.5 | 18% | 46 | | 52 | | | | | | | 58 | | | | | | 64 | | | | | |

Required MSCR values of the asphalt to be rated for Standard Traffic, Heavy Traffic, Very Heavy Traffic, or Extremely Heavy Traffic.

TABLE 1-continued

Required MSCR values of the asphalt to be rated for Standard Traffic, Heavy Traffic, Very Heavy Traffic, or Extremely Heavy Traffic.

Pressure Aging Vessel Residue (R 28)

| | | | | 90 | | | | 90 | | | 100 | | | 100 | | |
|---|---|---|---|---|---|---|---|---|---|---|---|---|---|---|---|---|
| PAV Aging Temp, °C[g] | | | | | | | | | | | | | | | | |
| Dynamic Shear, T 315: "S": G*(sinδ), max. 5000 kPa[c] test temp @ rad/s, °C | 5000 | 5600 | 12% | 10 | 7 | 4 | 25 | 22 | 19 | 16 | 13 | 31 | 28 | 25 | 22 | 19 | 16 |
| Dynamic Shear, T 315: "H", "V", "E" G*(sinδ), Max. 6000 kPa[c] | 6000 | 6720 | 12% | 10 | 7 | 4 | 25 | 22 | 19 | 16 | 13 | 31 | 28 | 25 | 22 | 19 | 16 |
| Creep stiffness, T 313:[h] S, max 300 MPa test temp @ 60 s, °C | 300 | 324 | 8% | −24 | −30 | −36 | 0 | −6 | −12 | −18 | −24 | −30 | −6 | −12 | −18 | −24 | −30 |
| m-value, min 0.300 | 0.300 | 0.285 | 5% | | | | | | | | | | | | | | |
| Direct Tension, T 314:[h] Failure strain, min 1.0% test temp @ 1.0 mm/min, °C | 1.0 | 0.8 | 20% | −24 | −30 | −36 | 0 | −6 | −12 | −18 | −24 | −30 | −6 | −12 | −18 | −24 | −30 |

Legend for Table 1 a MSCR Test on RTFO residue should be performed at the performance grade based on the environmental high pavement temperature. Grade bumping is accomplished by requiring a lower Jnr value while testing at the environmental temperature.

b Pavement temperatures are estimated from air temperatures using an algorithm contained in the LTPP Bind program, may be provided by the specifying agency or by following the procedures as outlined in M 323 and R 35, excluding the provisions for "grade bumping."

c This requirement may be waived at the discretion of the specifying agency if the supplier warrants that the asphalt binder can be adequately pumped and mixed at temperatures that meet all applicable safety standards.

d For quality control of unmodified asphalt binder production, measurement of the viscosity of their original asphalt binder may be used to supplement dynamic shear measurements of $G^*/\sin \delta$ at the test temperatures where the asphalt is at Newtonian fluid.

e $G^*/\sin \delta$=high temperature stiffness and $G^*\sin \delta$=intermediate temperature stiffness.

f The mass change shall be less than 1.00 percent for either a positive (mass gain) or a negative (mass loss) change.

g The PAV aging temperature is based on simulated climatic conditions and is one of three temperatures, 90° C., 100° C., or 110° C. Normally the PAV Aging temperature is 100° C. However, in desert climates the PAV aging temperature for PG 70-XX and above may be specified as 110° C.

h If the creep stiffness is below 300 MPa, the direct tension test is not required. If the creep stiffness is between 300 and 600 MPa, the direct tension failure strain requirement can be used in lieu of the creep stiffness. The m-value requirement must be satisfied in both cases.

As discussed above, the standard test method for multiple stress creep and recovery (MSCR) of asphalt binder using a dynamic shear rheometer is described in detail in ASTM D7405-15 and AASHTO T350, which are hereby incorporated by reference in their entirety. This test method covers the determination of percent recovery and non-recoverable creep compliance of asphalt binders by means of Multiple Stress Creep and Recovery (MSCR) testing. The MSCR test is conducted using the Dynamic Shear Rheometer (DSR) at a specified temperature. This standard is appropriate for unaged material, material aged in accordance with Test Method D2872 (RTFO), material aged in accordance with Practice D6521 (PAV), and material aged in accordance with both Test Method D2872 and Practice D6521.

This test method is used to determine the presence of elastic response in an asphalt binder under shear creep and recovery at two stress levels at a specified temperature. For performance grade (PG) binders, the specified temperature will typically be the PG high temperature without grade bumping as determined in Specification D6373 or AASHTO M 332, which is hereby incorporated by reference in its entirety. Sample preparation and apparatus are in accordance with Test Method D7175 using the 25-mm parallel plate geometry with a 1-mm gap setting. The sample is loaded at constant stress for 1 s then allowed to recover for 9 s. Twenty creep and recovery cycles are run at 0.100 kPa creep stress followed by ten creep and recovery cycles at 3.200 kPa creep stress. Non-recoverable creep compliance has been shown to be an indicator of the resistance of an asphalt binder to permanent deformation under repeated load.

This test method is also useful as a surrogate for other test methods used to measure elasticity in asphalt binders such as Test Method D5801 (Toughness and Tenacity), Test Method D6084 (Elastic Recovery), and Test Method D7175 (DSR phase angle), all of which are incorporated by reference in their entirety.

Another useful test method is described in Test Method ASTM D7173 which is incorporated by reference in its entirety and determines the separation tendency of polymer from polymer modified asphalt which describes a laboratory procedure for determining the tendency of polymer to separate from polymer modified asphalt under static heated storage conditions. The results of testing on material prepared according to this practice may be used as a guideline when formulating products or to establish field handling procedures. Large differences in test results between top and bottom specimens indicate that there is a degree of incompatibility between the polymer and the base asphalt.

A measured quantity of polymer modified asphalt in a sealed aluminum tube is conditioned in a vertical position for 48 h at a temperature of 163±5° C. At the end of the conditioning period, top and bottom portions are separated and subjected to further testing to determine the degree of separation. Tests chosen for this purpose depend on the polymer modification system being evaluated and the type of information desired by the user. Softening Point (Test Method D36) and DSR (Test Method D7175), both of which are hereby incorporated by reference in their entirety, are the most common tests used for this purpose.

Example 3—Results of Marathon Petroleum (PG: 67-22) Base Binder Modified with Poly(Isoprene)

Table 2 shows the asphalt blends with unmodified GTR. These softening point results will be used as the control for future experiments. It can be seen that, as expected, the softening point on the bottom is higher than the top, as GTR tends to settle over time without further mixing as shown in FIG. 1.

Figure 3:
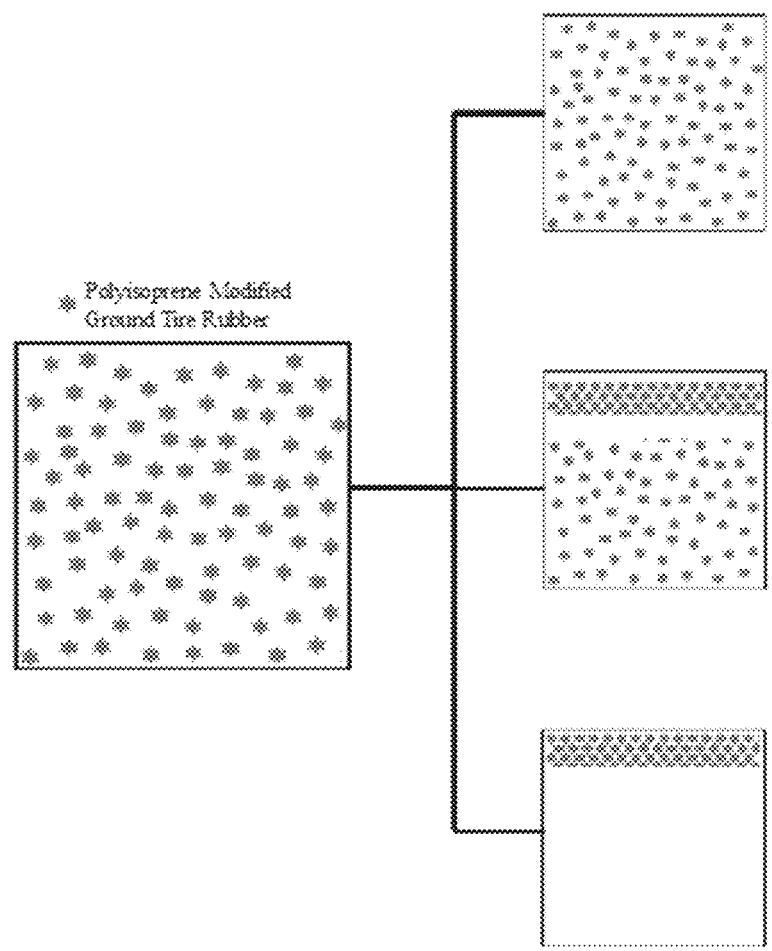
FIG. 3 depicts the GTR particles after modification with elastomeric polymer polyisoprene. The image illustrates the different scenarios that can be obtained with the technology of the present invention: uniform dispersion of the GTR particles throughout the asphalt, the dispersion of the GTR particles throughout the asphalt favoring the top, and the GTR particles going to the top of the asphalt.

Table 3 shows three asphalt blends with modified GTR. The table shows the three blends with the highest degree of density modification, which is evident in the softening point being higher at the top than at the bottom, opposite to the results obtained in Table 2. These results show that the density of GTR was modified in such a way that is now floating in the asphalt instead of settling to the bottom. FIG. 3 depicts the GTR particles after being modified with polyisoprene. The image illustrates the different scenarios that can be obtained with the technology of the present invention: uniform dispersion of the GTR particles throughout the asphalt, the dispersion of the GTR particles throughout the asphalt favoring the top, and the GTR particles going to the top of the asphalt.

Table 4 shows the asphalt blends with the smallest difference in softening point between the top and bottom softening points. Table 5 shows the best result in terms of separation and at the same time has the highest increase in the softening point.

TABLE 2

Table of asphalt blends with unmodified GTR. It can be seen that the softening point on the bottom is higher than the top, as GTR tends to settle over time without further mixing. Base Binder: Marathon Petroleum 67-22

| Cryo Crushed Ground Tire Rubber | | Softening Point AASHTO T 53-09 ASTM D36-0 | | | | | | | | |
| --- | --- | --- | --- | --- | --- | --- | --- | --- | --- | --- |
| | | Top #1 (°C.) | Top #2 (°C.) | Top #3 (°C.) | Bottom #1 (°C.) | Bottom #2 (°C.) | Bottom #3 (°C.) | Average Top (°C.) | Average Bottom (°C.) | Degree Difference (°C.) |
| 12% | No additive | 59.6 | 60.1 | 59.9 | 65.4 | 65.7 | 66.2 | 59.9 | 65.8 | −5.9 |
| 15% | | 60.1 | 60.2 | 60.4 | 67.8 | 68.3 | 68.9 | 60.2 | 68.3 | −8.1 |
| 20% | | 72.9 | 73.1 | 73.3 | 85.1 | 85.6 | 84.8 | 73.1 | 85.2 | −12.1 |

TABLE 3

Table of asphalt blends with the modified GTR with the highest degree of modification, softening point higher at the top than at the bottom where it is expected. Base Binder: Marathon Petroleum 67-22

| Cryo Crushed Ground Tire Rubber | Additive | Softening Point AASHTO T 53-09 ASTM D36-0 | | | | | | | | |
| --- | --- | --- | --- | --- | --- | --- | --- | --- | --- | --- |
| | | Top #1 (°C.) | Top #2 (°C.) | Top #3 (°C.) | Bottom #1 (°C.) | Bottom #2 (°C.) | Bottom #3 (°C.) | Average Top (°C.) | Average Bottom (°C.) | Degree Difference (°C.) |
| 12.0 | HMW Poly(Isoprene), CIS 25% (5 passes) | 77.2 | 67 | 70 | 61.3 | 61.6 | 61.9 | 71.4 | 61.6 | 9.8 |
| 20.0 | HMW Poly(Isoprene), CIS 12.5% | 79.7 | 74 | 78.4 | 72.7 | 72.5 | 73.4 | 77.4 | 72.9 | 4.5 |
| 20.0 | LMW Poly(Isoprene), CIS 6.25% | 76.6 | 79.7 | 81.6 | 75.4 | 75.2 | 75.5 | 79.3 | 75.4 | 3.9 |

TABLE 4

Table of asphalt blends with the modified GTR with the smallest difference in softening point between the top and bottom softening points. Base Binder: Marathon Petroleum 67-22

| Cryo Crushed Ground Tire Rubber | Additive | Softening Point AASHTO T 53-09 ASTM D36-0 | | | | | | | | |
| --- | --- | --- | --- | --- | --- | --- | --- | --- | --- | --- |
| | | Top #1 (°C.) | Top #2 (°C.) | Top #3 (°C.) | Bottom #1 (°C.) | Bottom #2 (°C.) | Bottom #3 (°C.) | Average Top (°C.) | Average Bottom (°C.) | Degree Difference (°C.) |
| 12.0 | Poly(Isoprene), Trans 25% | 69.6 | 70.8 | 71.2 | 68.9 | 68 | 69.2 | 70.5 | 68.7 | 1.8 |
| 15.0 | LMW Poly(Isoprene), CIS 6.25% | 66.5 | 66.8 | 66.7 | 68.9 | 69.2 | 69.3 | 67.9 | 69.1 | −1.2 |
| 12.0 | Poly(Isoprene), Trans 50% | 79 | 78.2 | 78.6 | 80.4 | 80.3 | 80.3 | 78.6 | 80.3 | −1.7 |
| 20.0 | LMW Poly(Isoprene), CIS 12.5% | 73.4 | 73.6 | 73.3 | 75.6 | 75.3 | 75 | 73.4 | 75.3 | −1.9 |

TABLE 5

Table of asphalt blends with the modified GTR with the smallest difference in softening point between the top and bottom softening points and the highest improvement in softening point. Base Binder: Marathon Petroleum 67-22

| Cryo Crushed Ground Tire Rubber | Additive | Softening Point AASHTO T 53-09 ASTM D36-0 | | | | | | | | |
|---|---|---|---|---|---|---|---|---|---|---|
| | | Top #1 (° C.) | Top #2 (° C.) | Top #3 (° C.) | Bottom #1 (° C.) | Bottom #2 (° C.) | Bottom #3 (° C.) | Average Top (° C.) | Average Bottom (° C.) | Degree Difference (° C.) |
| 12.0 | Isoprene, Trans 50% | 79 | 78.2 | 78.6 | 80.4 | 80.3 | 80.3 | 78.6 | 80.3 | −1.7 |

Example 4—Results of Jebro (PG: 58-28) Base Binder Modified with PI, PB, and PIB For the second set of experiments the base binder was changed to a PG: 58-28 from Jebro. All polymer loadings were kept to 12% by mass of the total asphalt blend. It can be seen In Table 6 below that the samples PI Trans, PI HMW, PB-402, and some samples of PIB decreased the separation of GTR, according to ASTM D36-0, and in the case of PB-402 at 25% it almost eliminated all separation.

TABLE 6

Table of the Ball and Ring Test (AST1M D36-0) and the MSCR test results of the 12% of the total asphalt binder with different GTR/Polymer blends. Base Binder: Jebro 58-28

| % GTR | % Polymer | Polymer | ASTM D36-0 | | | 3.2 kPa % Recover (@ 58° C.) MSCR | | | |G*|/sin(δ) (@ 76° C.) | | % | AASHTO T350 Traffic Designation | |
|---|---|---|---|---|---|---|---|---|---|---|---|---|---|
| | | | Top | Bottom | Difference | Top | Bottom | Difference | Top | Bottom | Difference | Top | Bottom |
| 100 | | | 54.30 | 61.57 | −7.27 | 10.66 | 19.63 | −8.96 | 1.98 | 1.90 | 1.98 | S | S |
| 75 | 25 | Isoprene HMW | 57.37 | 55.60 | 1.77 | 22.56 | 10.18 | 12.39 | 2.67 | 1.61 | 24.71 | S | S |
| 50 | 50 | Isoprene Trans | 54.87 | 57.13 | −2.27 | 11.77 | 23.81 | −12.04 | 0.90 | 1.52 | 25.62 | S | S |
| 75 | 25 | Isoprene Trans | 57.07 | 56.73 | 0.33 | 17.09 | 16.77 | 0.32 | 1.86 | 1.76 | 2.76 | S | S |
| 75 | 25 | PB-402 | 55.67 | 55.70 | −0.03 | 14.77 | 15.64 | −0.87 | 1.30 | 1.31 | 0.38 | S | S |
| 87.5 | 87.5 | PB-402 | 56.33 | 57.37 | −1.03 | 16.11 | 22.43 | −6.32 | 1.27 | 1.64 | 12.61 | S | S |
| 94 | 6 | PB-402 | 52.83 | 54.20 | −1.37 | 11.03 | 18.48 | −7.45 | 0.92 | 1.24 | 14.68 | S | S |
| 75 | 25 | PIB | 48.13 | 56.73 | −8.60 | 0.94 | 21.16 | −20.22 | 0.54 | 1.58 | 48.98 | S | S |
| 87.5 | 87.5 | PIB | 50.23 | 57.67 | −7.43 | 2.09 | 25.20 | −23.11 | 0.56 | 1.69 | 50.30 | S | H |
| 94 | 6 | PIB | 53.00 | 56.87 | −3.87 | 8.89 | 22.57 | −13.68 | 0.89 | 1.51 | 25.73 | 5 | 5 |

Example 5—Effect of Particle Size on the Final Separation of the Modified GTR in the Asphalt Blends To test the effect of pellet size in the modified GTR blending in the base asphalt. A 75/25% by weight sample of GTR/HMW PI was cry-grinded for 10 and 20 minutes to obtain two distinct grain sizes. It was observed that the smaller the particles size the better the homogeneity of the blends as observed in Table 7 below. The ASTM D36-0 and the MSCR both show a reduction in the separation and difference in the recovery from top and bottom.

TABLE 7

Table of the Ball and Ring Test (ASTIM D36-0) and the MSCR test results of 75/25%
by weight GTR/HMW PI blend. Base Binder: Jebro 58-28

| Milling | ASTM D36-0 | | | 3.2 kPa % Recovery (@ 58° C.) MSCR | | | $|G^*|/\sin(\delta)$ (@ 76° C.) % | | | 58° C. Traffic Grade MSCR | |
|---|---|---|---|---|---|---|---|---|---|---|---|
| Time (min) | Top | Bottom | Difference | Top | Bottom | Difference | Top | Bottom | Difference | Top | Bottom |
| 0 | 57.37 | 55.60 | 1.77 | 22.56 | 10.18 | 12.39 | 2.67 | 1.61 | 24.71 | S | S |
| 10 | 59.17 | 55.83 | 3.33 | 23.96 | 7.60 | 16.36 | 2.85 | 1.21 | 40.33 | S | S |
| 20 | 56.93 | 57.93 | −1.00 | 16.78 | 17.27 | −0.49 | 2.01 | 1.79 | 5.70 | S | S |

Example 6—Separation: Complex Modulus and Separation Index

A dynamic shear rheometer (DSR) was used to test the rheological parameters of the shear modulus (G*) and phase angle (δ). A 25-mm diameter plate geometry with 1-mm gap was used at 60° C. The separation index was determined using the following equation:

$$\% \text{ Seperation} = \frac{(G^*/\sin\delta)_{max} - (G^*/\sin\delta)_{avg}}{(G^*/\sin\delta)_{avg}} \quad \text{Equation 2}$$

The target for minimal separation is less than 10% between the top and bottom thirds of the cigar tube. Under these conditions, the lower isoprene trans and the two higher loadings of the polybutadiene are successful at improving the storage stability of the asphalt blends (Table 8). Polyisobutylene exceeds the separation criteria, while the isoprene HMW and lowest polybutadiene loading are not improved over the base rubber mixture.

TABLE 8

Table of the separation index of the 12% of the total asphalt binder with
different GTR/Polymer blends. Base Binder: Jebro 58-28

| % GTR | % Polymer | Polymer | Separation Index ($|G^*|/\sin(\delta)$) | | |
|---|---|---|---|---|---|
| | | | Top | Bottom | Difference |
| 100 | | | 8.38 | 12.28 | 18.86 |
| 75 | 25 | Isoprene HMW | 14.33 | 11.13 | 12.58 |
| 50 | 50 | Isoprene Trans | 9.95 | 14.10 | 17.24 |
| 75 | 25 | Isoprene Trans | 11.92 | 10.90 | 4.45 |
| 75 | 25 | PB-402 | 7.84 | 9.03 | 7.05 |
| 87.5 | 87.5 | PB-402 | 11.21 | 9.29 | 9.38 |
| 94 | 6 | PB-402 | 8.32 | 5.93 | 16.74 |
| 75 | 25 | PIB | 5.68 | 7.53 | 14.01 |
| 87.5 | 87.5 | PIB | 3.97 | 6.52 | 24.25 |
| 94 | 6 | PIB | 8.15 | 11.26 | 16.02 |

Example 7—Unaged High Temperature

An advantage of using GTR in asphalt mixtures is the improvement in the high temperature grade of the blended binder. The original base binder is Jebro a PG 58-28, and the continuous high temperature grades are shown for each blend in Table 9. Based on the high temperature grades, each blend results in a higher grade than the base bitumen and in many instances, they are higher than the base bitumen modified with only the GTR (77.3° C.).

TABLE 9

Table of the upper grade of the 12% of the total asphalt binder
with different GTR/Polymer blends. Base Binder: Jebro 58-28

| % GTR | % Polymer | Polymer | Unaged Fail Temp (° C.) |
|---|---|---|---|
| 100 | | | 77.3 |
| 75 | 25 | Isoprene HMW | 82.7 |
| 50 | 50 | Isoprene Trans | 85.2 |
| 75 | 25 | Isoprene Trans | 82.7 |
| 75 | 25 | PB-402 | 77.1 |
| 87.5 | 87.5 | PB-402 | 78.7 |
| 94 | 6 | PB-402 | 77.1 |
| 75 | 25 | PIB | 73.0 |
| 87.5 | 87.5 | PIB | 74.1 |
| 94 | 6 | PIB | 76.5 |

Example 8—Methods for Measuring Density

ASTMD297-15, ASTMD70-09—Density measurements were performed according to ASTM D297-15 and ASTM D70-09 at room temperature. A clean, dry pycnometer was weighed to the nearest 0.001 g, then filled completely with methanol and weighed again. Sample was added to pycnometer until it was approximately three quarters full and weighed again. The following equation was used to calculate density.

$$\text{Density}\left(\frac{\text{g}}{\text{cm}^3}\right) = \frac{0.9971 * A}{A - (B - C)} * D \quad \text{Equation 1}$$

| A | Mass of sample (g) |
|---|---|
| B | Mass of pycnometer + sample + methanol (g) |
| C | Mass of pycnometer + sample |
| D | Density of methanol (0.971 g/cm$^3$) |

Example 9—Results of Density Measurements

Experimental results were obtained using the above formula and following the ASTM standards. Calculated results are calculated by multiplying the density of GTR times its weight percent plus the density of the additive times its weight percent.

TABLE 10

Density Measurements

| % GTR | % Polymer | Polymer | Density (g/cm³) Experimental | Density (g/cm³) Calculated |
|---|---|---|---|---|
| 100 | | | 1.12 | 1.12 |
| 75 | 25 | Isoprene HMW | 1.02 | 1.06 |
| 50 | 50 | Isoprene Trans | 1.02 | 1.03 |
| 75 | 25 | Isoprene Trans | 1.02 | 1.08 |
| 75 | 25 | PB[a] | 1.08 | 1.07 |
| 87.5 | 12.5 | PB | 1.09 | 1.09 |
| 94 | 6 | PB | 1.11 | 1.11 |
| 75 | 25 | PB-402[b] | 1.04 | 1.07 |
| 87.5 | 12.5 | PB-402 | 1.12 | 1.09 |
| 94 | 6 | PB-402 | 1.10 | 1.11 |

[a]PB: Polybutadiene
[b]PB-402: Polyisobutylene

TABLE 11

Polymer Density

| Polymer | Density (g/cm³) |
|---|---|
| GTR | 1.12 |
| Isoprene Cis | 0.90 |
| Isoprene Trans | 0.95 |
| PB-402* | 0.91 |
| PB** | 0.90 |

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. An asphalt product comprising:
   a mineral aggregate;
   an asphalt component; and
   a plurality of pellets mixed with the asphalt component and comprising a mixture of:
   a ground tire rubber ("GTR"); and
   an elastomeric polymer, wherein the asphalt component and the plurality of pellets have a difference in density of less than 10%%,
   wherein the GTR is modified with the elastomeric polymer such that the modified GTR has a density below the density of the asphalt component.

2. The asphalt product of claim 1, wherein the mineral aggregate is selected from the group consisting of sand, gravel, limestone, crushed stone, and combinations thereof.

3. The asphalt product of claim 2, wherein the asphalt product is in the form of asphalt concrete.

4. A method of producing an improved asphalt comprising:
   providing an asphalt component;
   providing a plurality of pellets each comprising a mixture of:
   a ground tire rubber ("GTR") and
   an elastomeric polymer mixed with the GTR; and
   mixing the asphalt component with the plurality of pellets under conditions effective to produce an asphalt product comprising a mixture the asphalt component and the plurality of pellets, wherein the GTR is modified with the elastomeric polymer such that the modified GTR has a density below the density of the asphalt component and wherein the asphalt component and the plurality of pellets have a difference in density of less than 10%, wherein the elastomeric polymer comprises a polymer having a repeating unit of Formula (I),

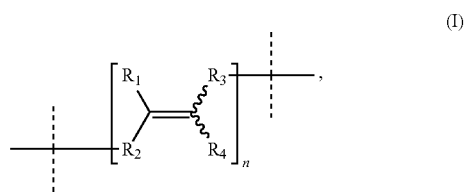

wherein $R_1$ is hydrogen or substituted or unsubstituted $C_1$-$C_6$ alkyl;

$R_2$ is a substituted or unsubstituted $C_1$-$C_6$ alkylene;

$R_3$ is a substituted or unsubstituted $C_1$-$C_6$ alkylene;

$R_4$ is hydrogen or substituted or unsubstituted $C_1$-$C_6$ alkyl;

wherein the optional substituents of $R_1$, $R_2$, $R_3$, and $R_4$ are present from 1 to 3 times for each of $R_1$, and $R_4$, and from 1 to 2 times for $R_2$, and $R_3$, with each substituent selected independently at each occurrence thereof from the group consisting of halogen, hydroxyl, $C_{1-6}$ alkyl, $C_{1-6}$ alkoxy, aryl, heteroaryl, and heterocyclyl;

wherein n is an integer from 1 to 10,000,000; each  indicates a bond with undefined geometric isomerism, and each

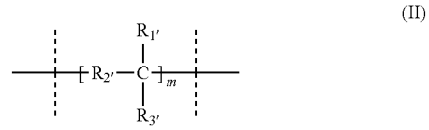

represents a possible point of attachment to an adjacent repeating unit, or a polymer having a repeating unit of Formula (II)

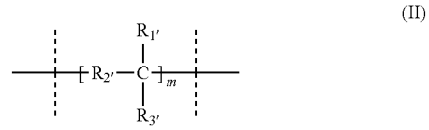

wherein $R_{1'}$ is selected from the group consisting of hydrogen and substituted or unsubstituted $C_1$-$C_6$ alkyl;

$R_{2'}$ is a substituted or unsubstituted $C_1$-$C_6$ alkylene;

$R_{3'}$ is selected from the group consisting of hydrogen, substituted or unsubstituted $C_1$-$C_6$ alkyl, and substituted or unsubstituted $C_1$-$C_6$ alkenyl and;

wherein the optional substituents of $R_{1'}$, $R_{2'}$, and $R_{3'}$ are present from 1 to 3 times for each of $R_{1'}$, and $R_{3'}$ and from 1 to 2 times for $R_{2'}$, with each substituent being selected independently at each occurrence thereof from the group consisting of halogen, hydroxyl, $C_{1-6}$ alkyl, $C_{1-6}$ alkoxy, aryl, heteroaryl, and heterocyclyl;

wherein m is an integer from 1 to 10,000,000; and each

represents a possible point of attachment to an adjacent repeating unit, or mixtures of the polymers of Formula (I) and Formula (II) are mixed with the asphalt.

5. The method of claim 4, wherein the elastomeric polymer is selected from the group consisting of a polyisoprene rubber, polybutadiene rubber, and polyisobutylene rubber.

6. The method of claim 4, wherein the elastomeric polymer is a polymer of Formula (I) selected from the group consisting of cis-1,4-polyisoprene, trans-1,4-polyisoprene, cis-1,4-polybutadiene, and trans-1,4-polybutadiene or is a polymer of Formula (II) selected from the group consisting of 1,2-addition polyisoprene and 3,4-addition polyisoprene.

7. The method of claim 4, wherein the plurality of pellets comprise between 5 wt % to 50 wt % of the asphalt product.

8. The method of claim 4, wherein the asphalt product has a softening point between 55 ° C. to 85 ° C.

9. The method of claim 4, wherein the plurality of pellets comprise a uniform dispersion of the asphalt component.

10. The method of claim 4, wherein said providing the plurality of pellets comprises:
   cryo-grinding the plurality of pellets.

11. The method of claim 4, wherein the density of the plurality of pellets is between 1.02 g/cm³ to 1.12 g/cm³.

12. The method of claim 4, wherein the difference in density is less than 5%.

13. The method of claim 4, wherein the plurality of pellets comprise 12wt % to 15wt % of the asphalt product.

14. A method of paving a surface comprising the steps of:
   (a) providing a ground tire rubber ("GTR");
   (b) providing an elastomeric polymer;
   (c) mixing the GTR and the elastomeric polymer to produce a GTR-elastomeric polymer mixture, wherein the GTR is modified with the elastomeric polymer such that the modified GTR has a density below the density of the asphalt component;
   (d) forming the GTR-elastomeric polymer mixture into a plurality of pellets;
   (e) mixing the plurality of pellets with an asphalt component, wherein the asphalt component and the plurality of pellets have a density difference of less than 10%; and
   (f) applying the mixture of the plurality of pellets and the asphalt component to a surface to be paved to form an applied paving material, wherein the elastomeric polymer comprises a compound having a repeating unit of Formula (I),

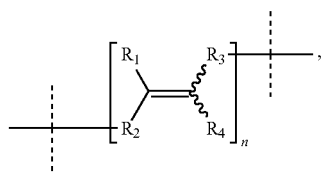

wherein R₁ is hydrogen or substituted or unsubstituted C₁-C₆ alkyl;

R₂ is a substituted or unsubstituted C₁-C₆ alkylene;
R₃ is a substituted or unsubstituted C₁-C₆ alkylene;
R₄ is hydrogen or substituted or unsubstituted C₁-C₆ alkyl;
wherein the optional sub stituents of R₁, R₂, R₃, and R₄ are present from 1 to 3 times for each of R₁, and R₄, and from 1 to 2 times for R₂, and R₃, with each substituent selected independently at each occurrence thereof from the group consisting of halogen, hydroxyl, C₁₋₆ alkyl, C₁₋₆ alkoxy, aryl, heteroaryl, and heterocyclyl;
wherein n is an integer from 1 to 10,000,000; each ⌿ indicates a bond with undefined geometric isomerism, and each

represents a possible point of attachment to an adjacent repeating unit, or
a polymer having a repeating unit of Formula (II)

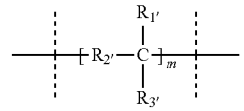

wherein R₁', is selected from the group consisting of hydrogen and substituted or unsubstituted C₁-C₆ alkyl;
R₂' is a substituted or unsubstituted C₁-C₆ alkylene;
R₃' is selected from the group consisting of hydrogen, substituted or unsubstituted C₁-C₆ alkyl, and substituted or unsubstituted C₁-C₆ alkenyl and;
wherein the optional sub stituents of R₁', R₂', and R₃' are present from 1 to 3 times for each of R₁', and R₃', and from 1 to 2 times for R₂', with each substituent being selected independently at each occurrence thereof from the group consisting of halogen, hydroxyl, C₁₋₆ alkyl, C₁₋₆ alkoxy, aryl, heteroaryl, and heterocyclyl;
wherein m is an integer from 1 to 10,000,000; and each

represents a possible point of attachment to an adjacent repeating unit, or mixtures of the polymers of Formula (I) and Formula (II).

15. The method of claim 14, wherein the elastomeric polymer is selected from the group consisting of a polyisoprene rubber, polybutadiene rubber, and polyisobutylene rubber.

16. The method of claim 14, wherein the elastomeric polymer is a polymer of Formula (I) selected from the group consisting of cis-1,4-polyisoprene, trans-1,4-polyisoprene, cis-1,4-polybutadiene, and trans-1,4-polybutadiene or a polymer of Formula (II) selected from the group consisting of 1,2-addition polyisoprene and 3,4-addition polyisoprene.

17. The method of claim 14, wherein said mixing is carried out at a temperature in steps (c) and/or (e) of 60 to 120° C.

18. The method of claim 14, wherein the plurality of pellets comprise a uniform dispersion of the asphalt component.

19. The method of claim 14, wherein the plurality of pellets comprise a non-uniform dispersion of the asphalt component.

20. The method of claim 14 further comprising:
cryo-grinding the plurality of pellets.

21. The method of claim 14, wherein the density of the plurality of pellets is between 1.02 g/cm$^3$ to 1.12 g/cm$^3$.

22. The method of claim 14, wherein the difference in density is less than 5%.

23. The method of claim 14, wherein the plurality of pellets comprise 12 wt % to 15 wt % of the asphalt product.

* * * * *

UNITED STATES PATENT AND TRADEMARK OFFICE
CERTIFICATE OF CORRECTION

| | |
|---|---|
| PATENT NO. | : 11,702,544 B2 |
| APPLICATION NO. | : 17/562548 |
| DATED | : July 18, 2023 |
| INVENTOR(S) | : Eric W. Cochran et al. |

It is certified that error appears in the above-identified patent and that said Letters Patent is hereby corrected as shown below:

In the Claims

At Claim 1, Column 33, Line 47, delete "10%%" and insert --10%-- in its place.

At Claim 4, Column 33, Line 65, delete "mixture the" and insert --mixture of the-- in its place.

At Claim 4, Column 34, Line 25, delete "sub stituents" and insert --substituents-- in its place.

At Claim 4, Column 34, Line 61, delete "and;" and insert --; and-- in its place.

At Claim 4, Column 34, Line 62, delete "sub stituents" and insert --substituents-- in its place.

At Claim 14, Column 36, Line 5, delete "sub stituents" and insert --substituents-- in its place.

At Claim 14, Column 36, Line 37, delete "and;" and insert --; and-- in its place.

At Claim 14, Column 36, Line 38, delete "sub stituents" and insert --substituents-- in its place.

At Claim 21, Column 37, Line 10, delete "g/cm3to" and insert --"g/cm3 to"-- in its place.

Signed and Sealed this
Third Day of October, 2023

Katherine Kelly Vidal
*Director of the United States Patent and Trademark Office*